United States Patent
Han et al.

(10) Patent No.: US 12,554,780 B1
(45) Date of Patent: Feb. 17, 2026

(54) HYBRID RETRIEVAL AUGMENTED GENERATION FOR RICH DOCUMENT QUERIES USING A LARGE LANGUAGE MODEL

(71) Applicant: Zoom Communications, Inc., San Jose, CA (US)

(72) Inventors: Jianbing Han, Los Gatos, CA (US); Shujian Liu, Newton, MA (US); Ying Lu, Cerritos, CA (US); Kai Ni, Sammamish, WA (US); Jun Tan, Pittsburgh, PA (US); Wang Tian, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 19/042,566

(22) Filed: Jan. 31, 2025

(51) Int. Cl.
*G06F 16/93* (2019.01)
*G06N 3/042* (2023.01)
*G06N 3/0455* (2023.01)

(52) U.S. Cl.
CPC ............. *G06F 16/93* (2019.01); *G06N 3/042* (2023.01); *G06N 3/0455* (2023.01)

(58) Field of Classification Search
CPC ....... G06F 16/93; G06N 3/042; G06N 3/0455
See application file for complete search history.

(56) References Cited

U.S. PATENT DOCUMENTS

2025/0053562 A1* 2/2025 Barrow ................. G06N 3/045
2025/0111204 A1* 4/2025 Eggert ................ G06F 16/3347

OTHER PUBLICATIONS

Ong, Isaac, et al. "RouteLLM: An Open-Source Framework for Cost-Effective LLM Routing" https://lmsys.org/ blog/2024-07-01-routellm/, Jul. 1, 2024, 8 pages.
Quian, Hongjin, et al. "MemoRAG: Moving towards Next-Gen RAG Via Memory-Inspired Knowledge Discovery." arXiv preprint arXiv:2409.05591, Sep. 10, 2024, 15 pages.
Edge, Darren, et al. "From local to global: A graph rag approach to query-focused summarization." arXiv preprint arXiv:2404.16130, Apr. 24, 2024, 15 pages.
Sarmah, Bhaskarjit, et al. "HybridRAG: Integrating Knowledge Graphs and Vector Retrieval Augmented Generation for Efficient Information Extraction." arXiv preprint arXiv:2408.04948, Aug. 9, 2024, 9 pages.

* cited by examiner

*Primary Examiner* — Hau H Hoang
(74) *Attorney, Agent, or Firm* — Kilpatrick Townsend & Stockton LLP

(57) ABSTRACT

Techniques for implementing hybrid retrieval augmented generation for rich document queries using a large language model ("LLM") are disclosed. In an example method, a computing system receives documents which are added to databases. The computing system receives a query, from which tokens are generated. The computing system determines a first ranking of the documents using a probabilistic ranking method and a second ranking of the documents in response to a vector database query using an embedded representation. The computing system determines a third ranking of the documents based on the first ranking and the second ranking. The computing system selects top documents from the third ranking. The computing system determines a knowledge graph based on the top documents. The computing system outputs the query, the top documents, and at least a portion of the knowledge graph to an LLM. The computing system receives and outputs a response.

20 Claims, 11 Drawing Sheets

HYBRID RETRIEVAL AUGMENTED GENERATION FOR RICH DOCUMENT QUERIES USING A LARGE LANGUAGE MODEL

FIELD

The present application generally relates to retrieval augmented generation ("RAG") technologies, and more particularly relates to systems and methods for hybrid RAG for rich document queries using a large language model ("LLM").

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
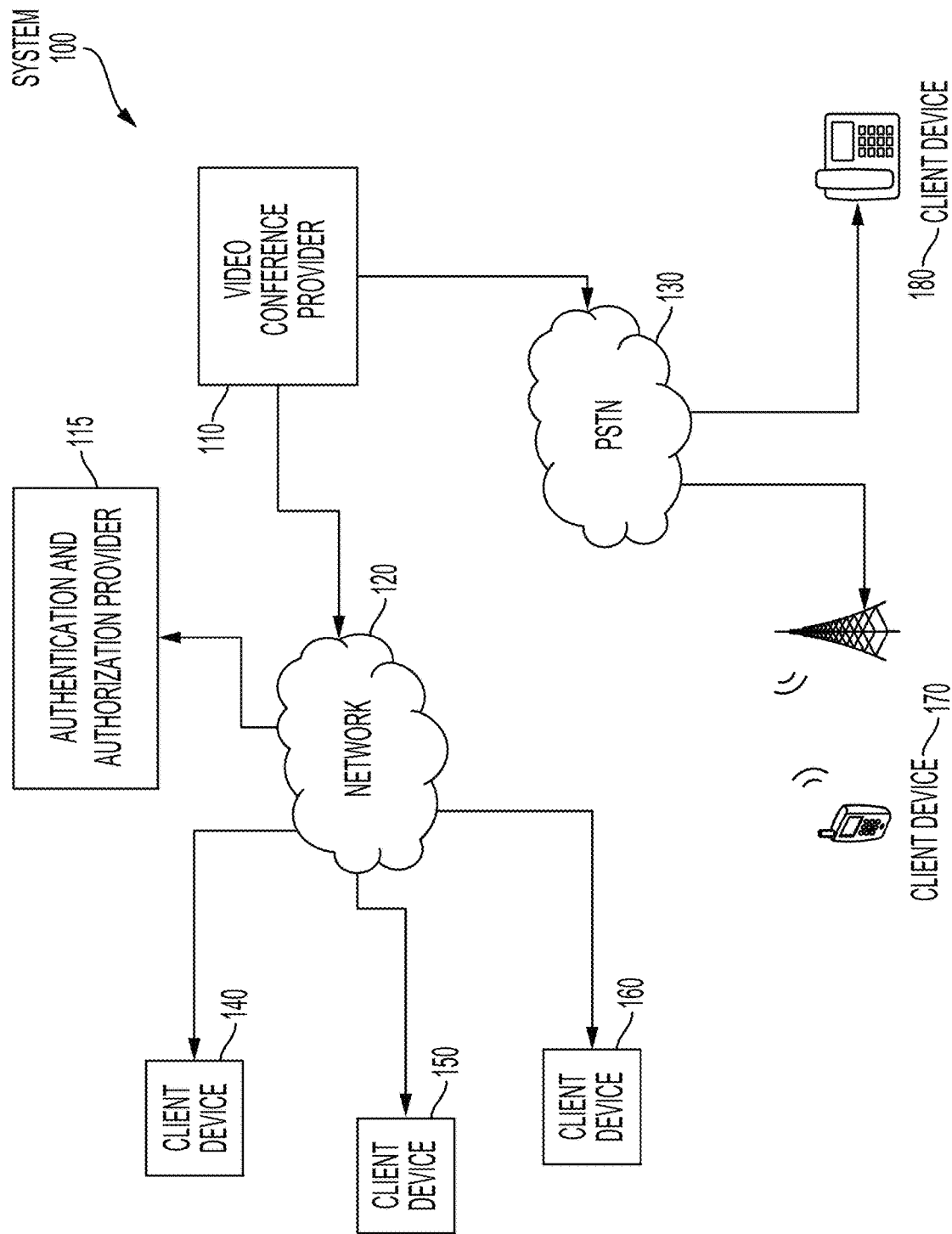
FIG. 1 shows an example system that provides videoconferencing functionality to various client devices, according to some aspects of the present disclosure.

Examples are described herein in the context of techniques for implementing hybrid RAG for rich document queries using an LLM. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Modern video conferencing client software suites may include a diverse constellation of digital communication media, enabling multi-modal personal and business communications using a variety of channels. At the same time, generative artificial intelligence ("AI") technologies such as large language models ("LLMs") are becoming progressively more integrated with video conferencing clients, taking advantage of the natural synergy between language and the growing number of use cases for LLMs.

For example, some video conference client software may be augmented with a virtual assistant or "AI companion" that can provide LLM services alongside clients. For instance, a video conference user interface may include a chat-like interface that can be used to engage with an AI companion about various aspects of the video conference, such as what has been discussed, who is present, what has been shared, and so on. In this example, the AI companion can respond in the context of the video conference content or data about the video conference (e.g., participant profile information).

The AI companion can likewise be used in a standalone mode of operation. For example, the AI companion can be provided with a corpus of documents and then queried in the context of those documents. However, many LLM implementations used by AI companions are limited by the size of their "context window" or the maximum amount of text an LLM can process at once. To enable LLMs to respond to queries in the context of datasets larger than the context window, techniques such as retrieval-augmented generation ("RAG") may be used. RAG involves techniques for enabling LLMs to respond in the context of datasets larger than the context window by adding only the relevant portions of the dataset to the context window based on the query.

While RAG can enable use of a broader spectrum of information by LLMs when generating responses, it is still limited in several ways. For example, RAG retrieves and adds portions of the dataset to the context window at query time, but neither this identified relevant information nor the subsequent responses are available to subsequent queries. In other words, existing RAG implementations lack any mechanism for handling long-term dependencies over multiple sessions. Additionally, existing RAG implementations can add documents or portions of documents, sometimes referred to as "chunks" to the context window. The addition of unstructured text to the context window fails to incorporate structured knowledge that may be known about the entities and subjects of the documents, leading to less complete or accurate answers than may be otherwise possible.

To address these difficulties, a user may employ hybrid RAG for rich document queries using an LLM, according to this disclosure. In one example, an LLM incorporating a hybrid approach to RAG can use a combination of a probabilistic ranking method to identify relevant documents, an embedding-based retrieval approach to further refine the identified documents, and RAG refinements that incorporate long-term dependencies and structured data. The hybrid approach can be designed to improve retrieval accuracy and to provide semantically relevant responses to queries across extended interactions and diverse domains.

The following non-limiting example is provided to introduce certain concepts. In the example method, a computing system providing an AI companion service to video conference software clients may first receive one or more documents such as account statements. For example, the AI companion may enable users to upload or select a set of documents to provide the context for queries. The computing system adds the documents to a vector database by first "chunking" the documents and then converting the chunks into embedded vector representations that can be queried using a vector similarity search to obtain a ranked selection of document chunks. A "vector similarity search" is a type of database query that identifies similar items by comparing numerical vector representations of the query and the stored data. The document chunks are likewise added to a sparse database configured for use with a probability ranking algorithm. The sparse database can be configured to return document chunks along with additional information used by the probability ranking algorithm to obtain another selection of ranked document chunks.

The computing system then receives, from a client device, a query including a number of terms. For example, the query may ask a question about the information contained in the documents. In the account statements example, the query may ask a question about account holders with a balance above a certain amount. The computing system tokenizes the query, which involves splitting the query into a number of portions and uses the tokens to determine a ranking of the uploaded documents by querying the sparse database and using the probabilistic ranking method such as BM25 to rank the results. In parallel with this, an embedded vector representation of the query is generated to query the vector database to receive a number of documents or chunks thereof identified as most relevant to the query, which are similarly ranked. The two rankings are combined and a number of top relevant ranked documents or document chunks is selected.

To provide structured information for generating a query response, a knowledge graph is then generated using the identified most relevant documents. For example, if the most relevant documents are a number of account statement portions, a knowledge graph can be generated using a specialized LLM that is a structured representation of the entities and relationships included in the account statements such as account holder information, transactions, and balances, and so on encoded as graph "nodes" and connecting "edges."

The computing system then outputs the query, the top relevant documents or chunks, and at least a portion of the generated knowledge graph to the context window of an LLM. The received response is output to the client device. In this example, the response may include information about the account holders with balances above a certain amount. Subsequent queries are responded to using long-term dependencies by outputting, to another specialized LLM, subsequent queries along with information about the first query and its associated response. The second LLM outputs one or more response "hints" that can be used to add long-term or multi-session context to the context window of the first LLM when responding to the second query. For example, the second query may ask a follow-up question in a later session about the previously named account holders. The response hints may include information from the first response that can be used to answer the second query.

Systems and methods according to the present disclosure provide significant improvements in the technical field of information retrieval methods such as RAG. Existing approaches limited to ranking functions such as BM25 often fail to achieve the desired level of semantic understanding and may altogether lack facilities for long-term memory. While existing RAG systems may exhibit improved semantic understanding, they nevertheless still struggle with the effective incorporation of structured knowledge and long-term dependencies. Consequently, the technical field of information retrieval methods lacked mechanisms for integrating structured and unstructured data in a manner that ensures contextual accuracy, scalability, and efficient retrieval of relevant information over extended periods such as multiple sessions or interactions. The techniques disclosed herein improve the technical field by combining the output of a specialized LLM or other machine learning ("ML") model for generating a knowledge graph, the output of another specialized LLM or other ML model for tracking long-term dependencies, and the output of a RAG subsystem, including documents retrieved from a vector database, to generate responses that address the challenges outlines above. This architecture provides a technical improvement over existing RAG systems by providing a mechanism that can integrate structured and unstructured data as well as long-term dependencies with arbitrarily sized corpuses of documents into LLM queries. By enabling LLMs to access and utilize this combination of elements, including structured knowledge for precise, contextual understanding and unstructured data for broader semantic information, the disclosed techniques can optimize the relevance, accuracy, and depth of generated responses. Consequently, the disclosed architecture provides not only a mechanism for integration but also a robust framework for leveraging this integration to optimize LLM query performance in ways that were previously unattainable.

These illustrative examples are given to introduce the reader to the general subject matter discussed herein and the disclosure is not limited to these examples. The following sections describe various additional non-limiting examples of systems and methods for implementing hybrid RAG for rich document queries using an LLM.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
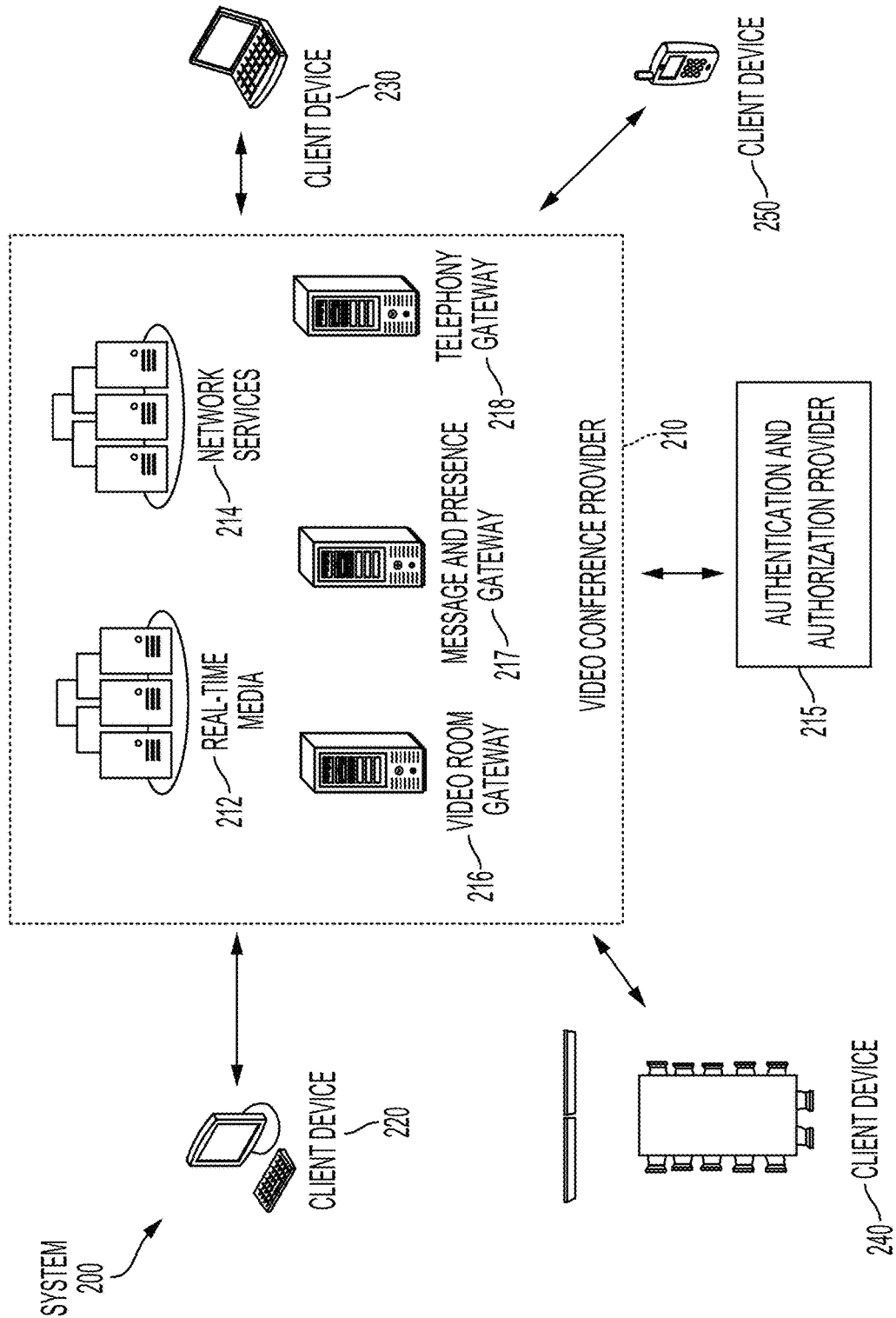
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
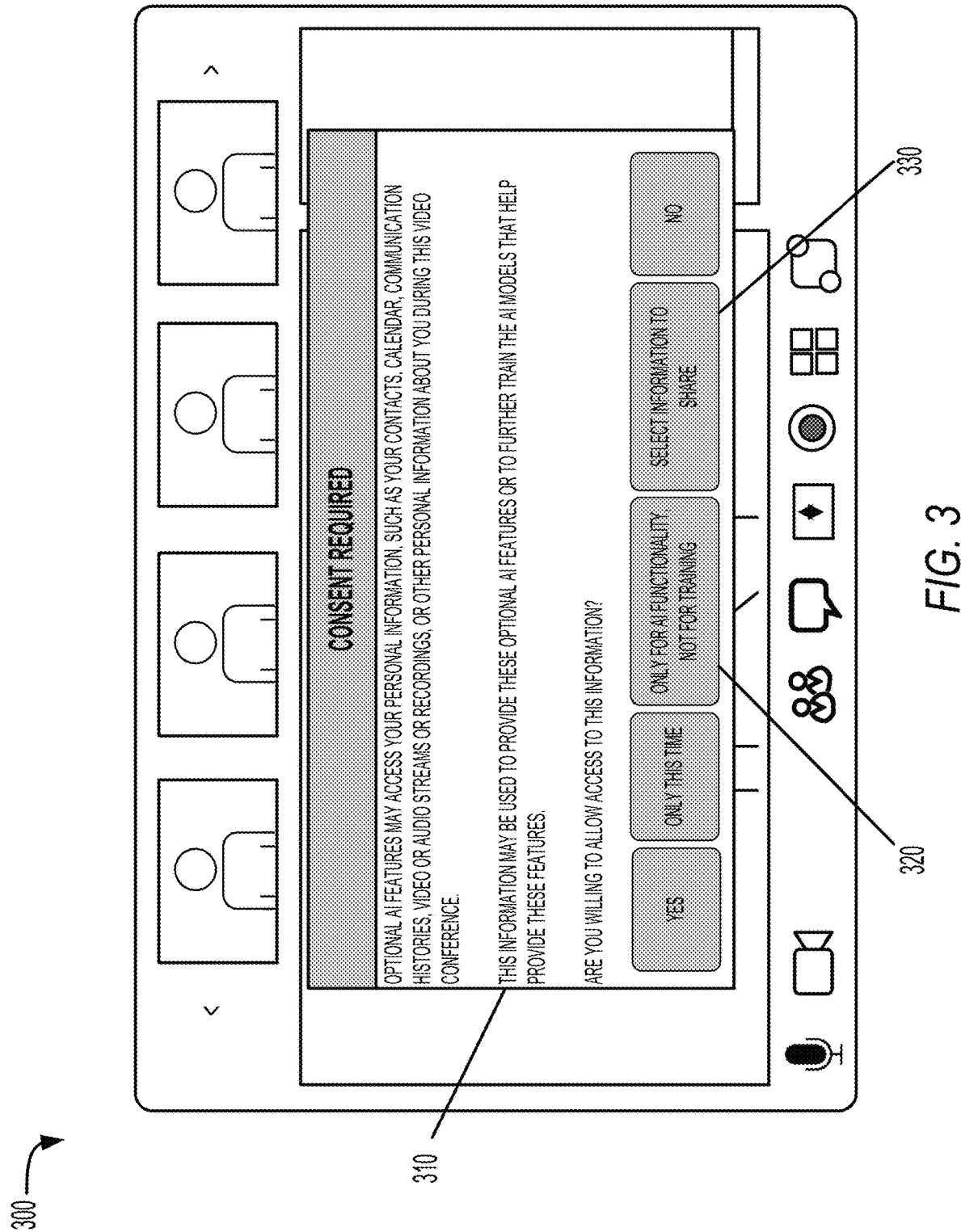
FIG. 3 shows an example user interface that may be used in some example systems configured for hybrid RAG for rich document queries using an LLM, according to some aspects of the present disclosure.

Turning next to FIG. 3, FIG. 3 shows an example user interface 300 that may be used in some example systems configured for hybrid RAG for rich document queries using an LLM, according to some aspects of the present disclosure. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
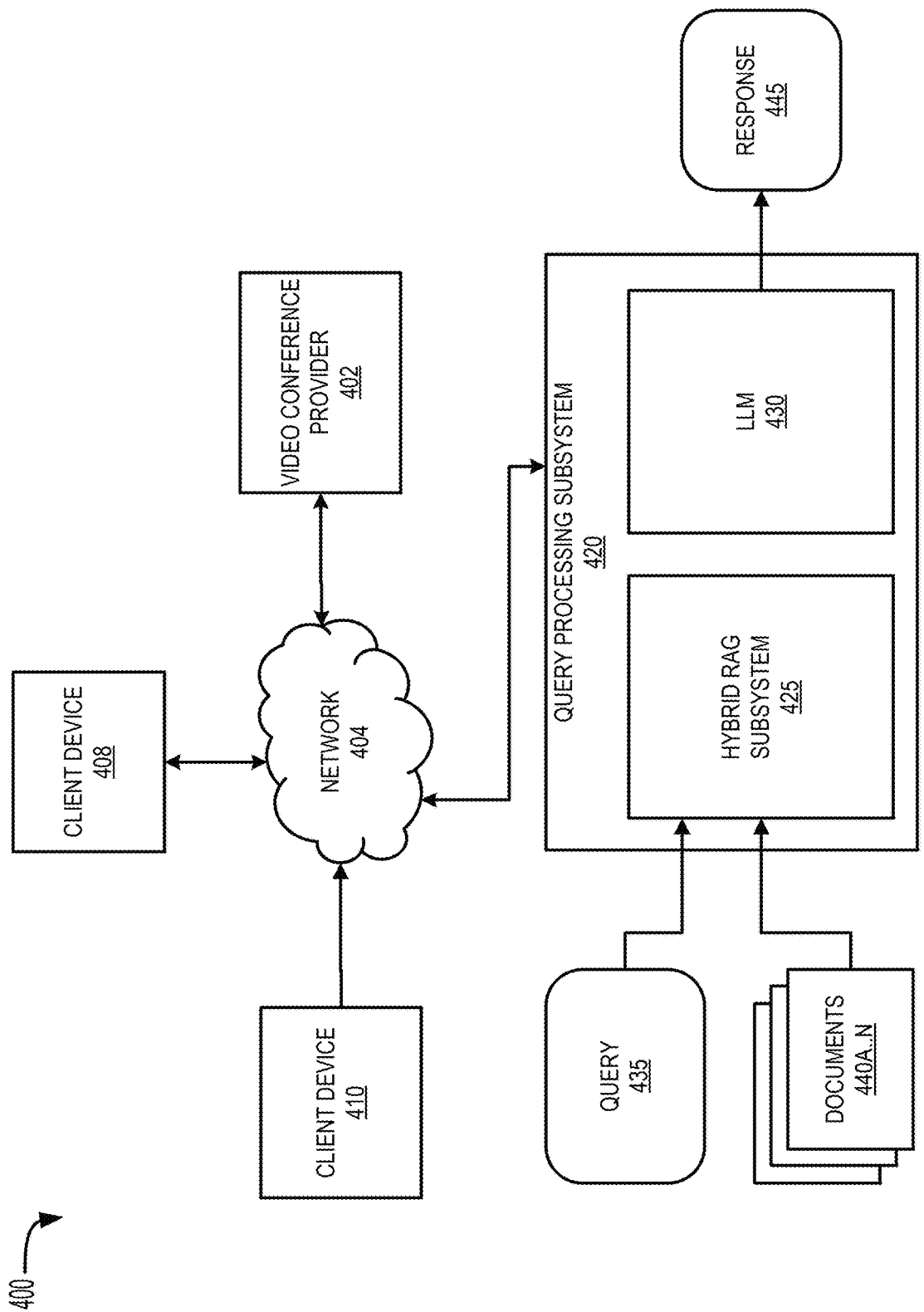
FIG. 4 shows an example of a system implementing hybrid RAG for rich document queries using an LLM, according to some aspects of the present disclosure.

Referring now to FIG. 4, FIG. 4 shows an example of a system 400 implementing hybrid RAG for rich document queries using an LLM, according to some aspects of the present disclosure. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the appropriate client software for hybrid RAG for rich document queries using an LLM. For example, the client devices 408, 410 may be laptops, desktops, smartphones, tablets, internet protocol (IP) phones, and so on. The client devices 408, 410 may include an input device (e.g., keyboard, microphone, etc.) that can be used to input queries that can be subsequently output to a query processing subsystem 420. In some examples, queries may be output to the query processing subsystem 420 by way of the video conference provider 402. For example, the query processing subsystem 420 may provide query processing services to the video conference provider by way of a web-based application programming interface ("API"). In some examples, the query processing subsystem 420 may be a component of the video conference provider 402, such as an internal software subcomponent or other associated software deployment. In some examples, the query processing subsystem 420 may be a component of the client devices 408, 410 and included, for example, as a subcomponent of a video conferencing client application executing on the client devices 408, 410.

The client devices 408, 410 are depicted in FIG. 4 in the context of a video conferencing or other digital communication infrastructure facilitated by the video conference provider 402. However, the client devices 408, 410 can execute client software for hybrid RAG for rich document queries using an LLM in a variety of contexts, or as a standalone application. For example, the client devices 408, 410 may be used in the context of customer support systems to provide real-time responses, educational platforms for interactive learning, collaborative content creation tools, enterprise knowledge management systems, healthcare applications for patient communication and data retrieval, and so on. As a standalone application, the client devices 408, 410 can be communicatively coupled with the query processing subsystem 420 over the network 404 with no intermediate system. For instance, the client devices 408, 410 may execute an app available through a commercial app store (e.g., the iPhone App Store or the Android Play Store) that accesses the query processing subsystem 420 as a backend for providing hybrid RAG for rich document queries using an LLM.

The query processing subsystem 420, as depicted in FIG. 4, includes components constituting an example implementation of a hybrid RAG subsystem 425 that can be used for rich document queries using an LLM (or a number of LLMs). In FIG. 4, the query processing subsystem 420 receives query 435. The query 435 may be output by, for example, the client devices 408, 410. The query 435 may be, for example, a question about information included in one or more documents 440A . . . N (sometimes referred to as a "corpus" of documents).

While information about the documents 440A . . . N can be included in the context window of a prompt directed to the LLM 430, in practice, the relatively small size of the context window constrains the amount of information that can be included. Consequently, RAG can be used to selectively include portions and/or representations of the documents 440A . . . N. For example, the hybrid RAG subsystem 425 can process the documents 440A . . . N and integrate them into a data storage system such as a vector database or sparse database, which can later be used as part of a RAG subsystem. As will be described below, the RAG subsystem can retrieve portions and/or representations of the documents 440A . . . N from the vector database or sparse database based on the query 435 and include the portions and/or representations in the context window of the LLM 430.

The query processing subsystem 420 includes an LLM 430. The LLM 430 may be a self-hosted LLM or third-party LLM accessible using a web-based API or other suitable method for remote access, or combination thereof. A self-hosted LLM can refer to an LLM that is pre-trained and deployed on a computing environment operated by the video conference provider 402 such as server hardware, virtual machines, or a cloud computing environment. Examples of popular self-hosted LLMs include Meta's Llama 2 and 3, Mistral (https://mistral.ai/), Falcon (https://falconllm.tii.ae/), the MPT models of the MosaicML Foundation series, and BLOOM (https://bigscience.huggingface.co/), among many others. Self-hosted LLMs may be hosted on private servers or private cloud infrastructure for specialized tasks. Alternatively, LLMs or models hosted by cloud providers such as Amazon Web Services (AWS), Microsoft Azure, or Google Cloud may be used. Examples of third-party LLMs include the OpenAI GPT series, the Claude models by Anthropic, Google's Gemini series, among many others. These examples are provided for context and are not intended to be limiting in any way.

The LLM 430 has a context window. In general, the context window of LLM 430 can refer to the amount of input text, including the query 435, and related context that the model can process at once. The context window size can be measured in tokens, where a token may represent a word, part of a word, or punctuation. The size of the context window effectively defines the amount of information that can be used to generate the response. For example, smaller context windows might truncate inputs or lose key contextual details, while larger context windows allow for more comprehensive understanding of complex, multi-turn interactions or extended prompts. In some examples, the context window size for self-hosted LLMs can be customized or expanded based on the available computational resources, in contrast to the context window for third-party LLMs which can be constrained by predefined context window limits set by the LLM provider.

While the query 435 can be output to the LLM 430 along with some additional context, as outlined above, this approach has numerous shortcomings including a small context window, no long-term or multi-session memory, a lack of structured data to augment the information included in the context window, among others. The hybrid RAG subsystem 425 thus includes additional components for implementing a RAG process, generating structured data, and for tracking long-term memories of interactions or other data. The outputs of the components of the hybrid RAG subsystem 425 are combined with the query 435 to generate an improved response 445. The response 445 can be provided to the originator of the query 435, such as the client devices 408, 410. In general, the hybrid RAG subsystem 425 can output additional information that can be included in the context window for prompting the LLM 430 to improve the accuracy or efficacy of the generated responses.

Figure 5:
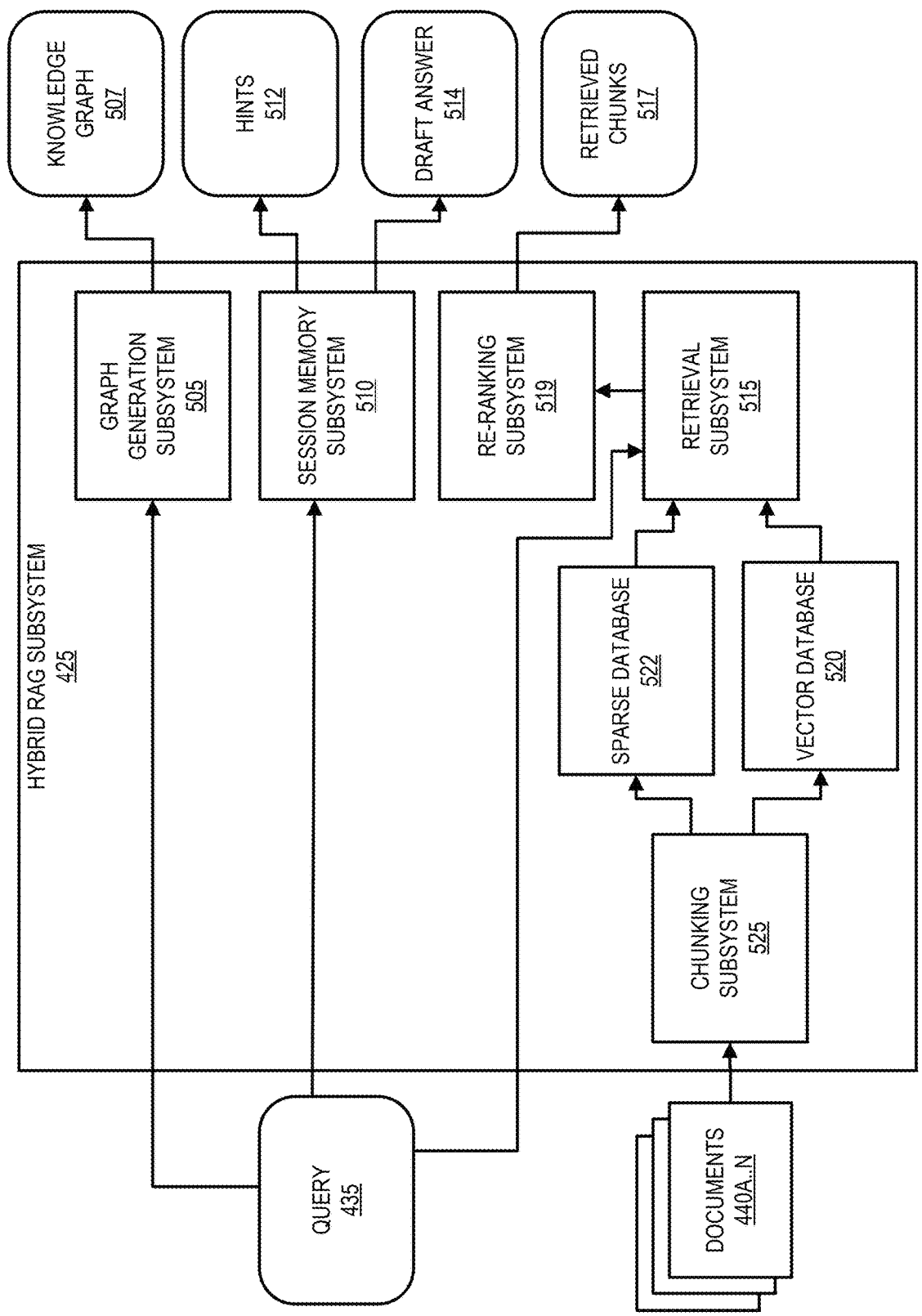
FIG. 5 shows an example implementation of a hybrid RAG subsystem 425, according to some aspects of the present disclosure.

Turning next to FIG. 5, FIG. 5 shows an example implementation of a hybrid RAG subsystem 425, according to some aspects of the present disclosure. As mentioned above, the hybrid RAG subsystem 425 can be used to determine additional information that can be included in the context window for prompting the LLM 430 to improve the accuracy or efficacy of the generated responses. In FIG. 5, several components are depicted that output structured and unstructured data such as a knowledge graph 507, hints 512, draft answer 514, and retrieved document chunks 517. These outputs can be included along with the query 435 and provided to the LLM 430 as part of a suitable prompt to generate response 445.

The hybrid RAG subsystem 425 includes graph generation subsystem 505. The graph generation subsystem 505 includes components for, upon receiving query 435, generating a knowledge graph (or knowledge graphs) based on the query 435, documents 440A . . . N, and other sources used during training of various constituent ML models. The generated knowledge graph 507 can be used to provide structured data to include in the context for responding to the query 435 by an LLM, along with the output of other subsystems and retrieval mechanism. The use of knowledge graphs can enable the query processing subsystem 420 to include entity relationships in the query context that can improve both the accuracy and coherence of generated responses.

The hybrid RAG subsystem 425 includes session memory subsystem 510. The session memory subsystem 510 includes components for generating hints 512 and draft answer 514 based on a persisted "contextual awareness" maintained over multiple user sessions, which can facilitate more accurate and consistent retrieval and generation of information based on previous interactions.

The hybrid RAG subsystem 425 includes a retrieval subsystem 515 that is part of an example RAG implementation shown in FIG. 5. The RAG implementation can include one or more document retrieval methods operating in parallel or in sequence. The example methods described here can be used individually or in combination, as depicted in this example. In the example hybrid RAG subsystem 425, a first retrieval method involves a sparse database 522 and a second retrieval method involves a vector database 520. In each case, the RAG implementation can be initialized by providing the documents 440A . . . N to the chunking subsystem 525. The chunking subsystem 525 can subdivide the documents 440A . . . N into smaller portions or "chunks."

The chunks may be chosen by chunking subsystem 525 to be, for example, optimized for processing by the vector database 520. For example, the chunking subsystem 525 may subdivide documents 440A . . . N into sections based on paragraph boundaries, semantic coherence, or fixed token limits to ensure compatibility with the embedding process of vector database 520. Token limits (e.g., chunk size) can ensure that each chunk is appropriately sized for efficient embedding generation and rapid similarity searches within the vector database 520.

Accordingly, the vector database 520, given a suitable query, can identify and retrieve chunks without processing the entire corpus for every query. During initialization, the chunked documents 440A . . . N can be input to the vector database 520. As the chunks are input, the vector database 520 can convert each chunk into an embedded, high-dimensional vector representation. The embedded representations can capture semantic meaning and enable efficient vector similarity searches given a query.

The vector database 520 can be configured to store, index, or retrieve high-dimensional vector data. The vector database 520 can employ vector similarity search algorithms such as Approximate Nearest Neighbors (ANN), cosine similarity, Euclidean distance, etc. to identify vector representations of chunks that are similar to the vector representation of the query 435. The vector database 520 may be a commercial, open-source, or custom implementation such as Pinecone (Pinecone Systems, Inc.; https://github.com/pinecone-io), Weaviate (Weaviate, B. V.; https://github.com/weaviate/weaviate), Milvus (Milvus; https://github.com/milvus-io/milvus), or Vespa (https://github.com/vespa-engine), among others.

The chunks can likewise be chosen to be optimized for processing by the sparse database 522. The sparse database 522 can be configured for use with a probabilistic ranking method such as BM25 that can select a number of relevant documents based on the ranking. The sparse database 522 can be any suitable database for use in conjunction with a probabilistic ranking method such as BM25, such as an inverted index database, a key-value store, or a document-oriented database. Non-limiting examples of commercial or open-source databases suitable for use as the sparse database 522 include Elasticsearch (Elastic) or Apache Solr, among others. In some examples, the sparse database 522 can preprocess and index the chunks to ensure effective term frequency and inverse document frequency (TF-IDF) calculations. The chunks may also be sized to maintain sufficient context and granularity according to the desired accuracy for the particular application.

The probabilistic ranking method can be any suitable method or algorithm such as BM25 that can rank the documents 440A . . . N chunks stored in sparse database 522 by estimating their relevance to the query based on factors such as term frequency, inverse document frequency, or document length normalization. BM25 refers to one of a number of ranking engines labeled using "BM" (for "Best Matching"). Non-limiting examples of other probabilistic ranking methods include BM25+, an improved BM25 implementation, Language Model for Information Retrieval (LMIR), or TF-IDF-based probabilistic models.

Retrieval subsystem 515, upon receipt of query 435, can use the query to 435 query the vector database 520 and the sparse database 522 in parallel. For example, the retrieval subsystem 515 accesses vector database 520 by performing similarity searches against the stored embeddings. The query 435 can itself be transformed into an embedded representation. Retrieval subsystem 515 can then identify chunks in the vector database 520 with the highest vector similarity scores to the embedded representation of the query 435. The vector database 520 may identify a number of chunks using this method, resulting in one or more retrieved ranked chunks.

Likewise, the retrieval subsystem 515 can receive the query 435 and generate tokens based on the various terms in the query 435. Then, the retrieval subsystem 515 can query the sparse database 522 to determine a ranking of the documents 440A . . . N using a probabilistic ranking method such as BM25 to obtain another ranking of relevant documents. For instance, the retrieval subsystem 515 can first tokenize the query, as described above. The retrieval subsystem 515 can output the tokenized query to the sparse database 522. The sparse database 522 may have, for example, an inverted index structure that can be used to retrieve document chunk information and associated metadata, such as term frequency and document length, that can be used by the retrieval subsystem 515 for probabilistic ranking method calculations. The retrieval subsystem 515 can, for example, generate relevance scores for each document or document chunk and generate a ranking of the documents 440A . . . N.

The document or document chunk ranking generated by querying the sparse database 522 and by querying the vector database 520, respectively, can be output by the retrieval subsystem 515 to the re-ranking subsystem 519. The re-ranking subsystem 519 can combine the first and second rankings. The re-ranking subsystem 519 can be further configured to select a predefined number or portion of top documents or document chunks from the re-ranked documents or document chunks. In some examples, the re-ranking subsystem 519 may be based on commercial or open source implementations such as Cohere (Cohere). The retrieved chunks 517 can be provided to the LLM 430 context window for responding to the query 435.

Figure 6:
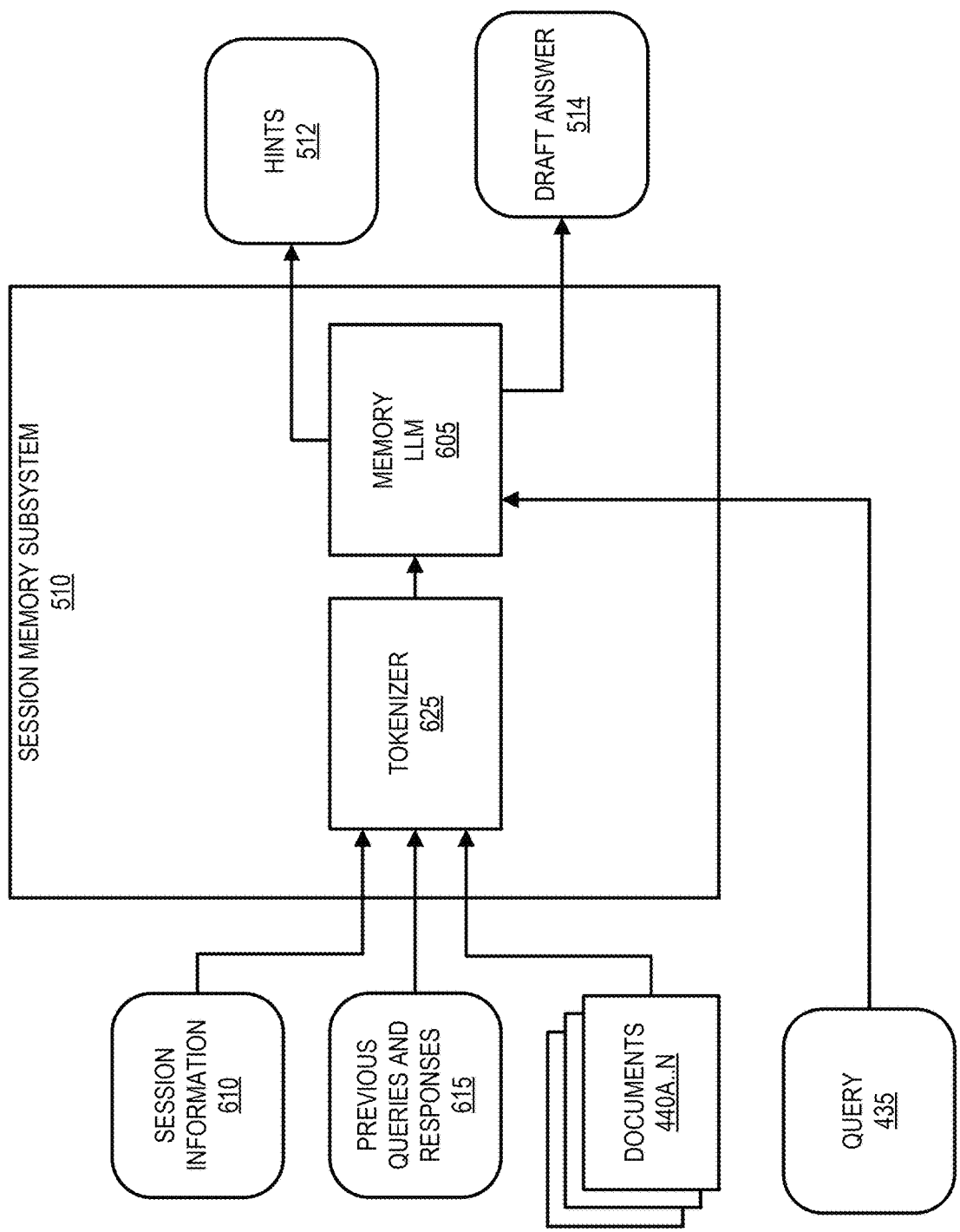
FIG. 6 shows an example implementation of a session memory subsystem, according to some aspects of the present disclosure.

Turning next to FIG. 6, FIG. 6 shows an example implementation of a session memory subsystem 510, according to some aspects of the present disclosure. The session memory subsystem 510 includes components for generating hints 512 and draft answer 514. In some examples, the session memory subsystem 510 may be based on commercial or open source implementations such as MemoRAG (e.g., https://github.com/qhjqhj00/MemoRAG). In some respects, the session memory subsystem 510 can be configured to store and retrieve long-term memory across interactions, such as among and between user sessions. consequently, the session memory subsystem 510 can persist and maintain a "contextual awareness" over multiple user sessions, which can facilitate more accurate and consistent retrieval and generation of information based on previous interactions.

As used herein, a "session" can refer generally to a period of continuous user activity. Sessions may be punctuated by intervals of inactivity of varying length. Multi-session memory can include information from any number of sessions. In some examples, the session memory subsystem 510 can be configured to track session information for a user or group of users indefinitely, so that the retained memory includes all past interactions. In some other examples, the session memory subsystem 510 can be configured to only retain session information for a specified period of time to conserve storage, context window capacity, or privacy.

In the example implementation shown in FIG. 6, the session memory subsystem 510 includes memory LLM 605 for generating hints 512 and draft answer 514 given query 435. In some examples, memory LLM 605 is the same as LLM 430. However, memory LLM 605 may also be a specialized LLM trained or fine-tuned for maintenance of multi-session or other long-term information. For instance, memory LLM 605 may be developed using a foundation model such as LLAMA and fine-tuned for the graph generation application. Alternatively, memory LLM 605 may be a third-party hosted LLM such as a model selected from the Generative Pre-trained Transformer ("GPT") series provided by OpenAI (e.g., GPT-4 and variants) we well as OpenAI models such o1 and o3, including custom instructions or configurations for maintenance of long-term dependencies.

The memory LLM 605 can be optimized for providing a large context window relative to other LLMs, such as GPT-4 or o1 (provided by OpenAI). In some examples, the available context window can be further expanded by with token compression that can enable efficient processing of long input sequences. In this context, "token compression" refers generally to techniques that can reduce the token count of the query 435 and other information included in the context window while preserving their semantic content such as summarization, vector quantization, or token clustering. In an example using a self-hosted, pre-trained LLM for memory LLM 605, a self-hosted, pre-trained LLM with 7 billion parameters and a compression ratios of between 2 and 16 can enable a context lengths up to 600,000 tokens.

Maintenance of long-term dependencies can be facilitated through inclusion of session information 610, previous queries and responses 615, and documents 440A . . . N (or a subset thereof) in the context window of the memory LLM 605 when prompted with query 435. The session information 610 may include information or metadata about previous user sessions, participants, times, locations, subject matter information, and so on. For example, if a user asks about a certain technical subject in the morning, information about the occurrence of the previous morning question can be included in a subsequent question posed in the afternoon.

Previous queries and responses 615 can likewise be included in context window. For example, previous queries (or a portion thereof) and the response generated by the LLM 430 for each query (or a portion thereof) can be included in the context window for subsequent queries. As responses can be overlong in some cases, it may be necessary to selectively truncated, modify, or compress responses to conserve context window capacity.

Along with the session information 610 and the previous queries and responses 615, the documents 440A . . . N are included in the context window. To conserve context window capacity and to maximize the size of the document corpus (e.g., documents 440A . . . N) that can be included in the context window, the tokenizer 625 can compress input information into a smaller set of "memory tokens" that retain semantic information. The tokenizer 625 may include an ML model, such as a transformer, which can process input sequences to generate the memory tokens, enabling the session memory subsystem 510 to populate the context window with as much information as possible. While tokenizing all input may enable for the inclusion of relatively large amounts of information in the context window of memory LLM 605, it may simultaneously result in some loss of semantic information, detail, multimedia content, repetition, or other aspects of the documents 440A . . . N and other inputs lost during a compressive tokenization process. Consequently, the memory LLM 605 can be used to develop hints 512 and a draft answer 514 to improve the accuracy of the response 445 generated by the LLM 430, as shown above with respect to FIG. 4.

The memory LLM 606 can be prompted to generate the hints 512 and the draft answer 514 given query 435. The prompt can be, for example, embedded in the context window of the memory LLM 605 along with the session information 610, previous queries and responses 615, and documents 440A . . . N in a compact, tokenized form as described above. The prompt can be generated using a template such as:

Query:
{{query}}
Document Corpus:
{{documents}}
Session Information
{{session_information}}

Previous Queries and Responses
{{queries:responses}}
Instructions:
Generate a response to the query in the context of the document corpus, session information, and previous query and response data provided. Also generate hints to assist another language model in answering the query based on the draft response you generate. Assume that the other language model will only receive a subset of the document corpus in its prompt.

In this example, the elements shown as "{{variable}}" indicate placeholder variables which the session memory subsystem 510 can replace with information such as the session information 610. the previous queries and responses 615, or the documents 440A . . . N. Other approaches for templates, placeholders, and prompt generation may be used to similar effect. While the example shown above is shown using human-readable text, in some examples, the generated prompt may be a tokenized or embedded representation that is interpretable by the memory LLM 605 but not necessarily human-readable.

Figure 7:
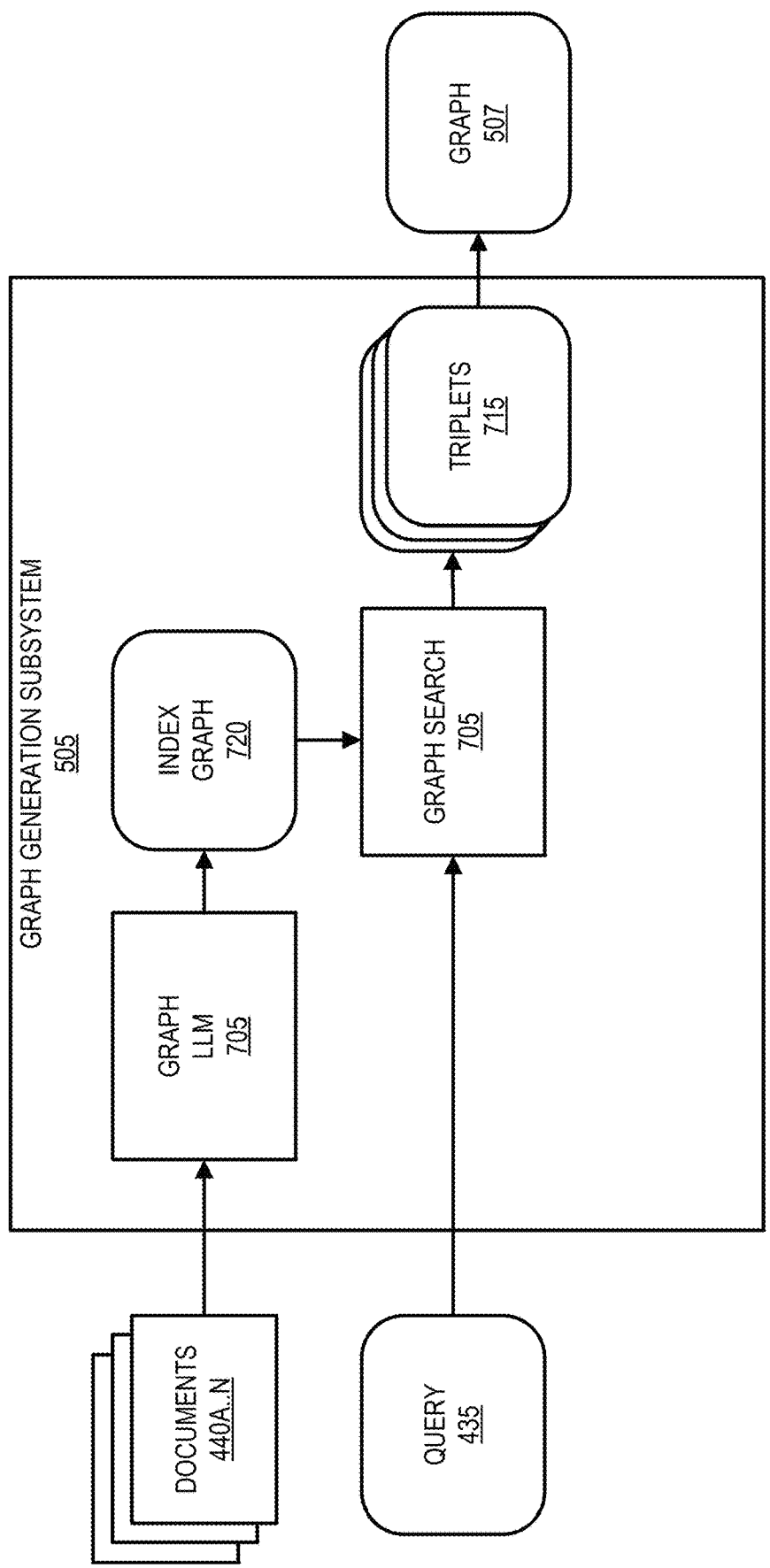
FIG. 7 shows an example implementation of a graph generation subsystem, according to some aspects of the present disclosure.

Turning next to FIG. 7, FIG. 7 shows an example implementation of a graph generation subsystem 505, according to some aspects of the present disclosure. The graph generation subsystem 505 includes components for generating knowledge graph 507. In some examples, the graph generation subsystem 505 may be based on commercial or open source implementations such as GraphRAG (e.g., https://github.com/microsoft/graphrag). Generation of knowledge graph 507 is facilitated by generation of index graph 720 prior to receipt of query 435. In some examples, generation of index graph 720 can be effected by processing documents 440A . . . N using graph LLM 705. In some examples, graph LLM 705 is the same as LLM 430. However, graph LLM 705 may also be a specialized LLM trained or fine-tuned for graph generation applications. For instance, graph LLM 705 may be developed using a foundation model such as LLAMA and fine-tuned for the graph generation application. Alternatively, graph LLM 705 may be a third-party hosted LLM such as ChatGPT, including custom instructions or configurations for graph generation. Specialized training or fine-tuning of LLMs for index graph 720 generation can involve, for example, training using datasets such as Freebase or Open Graph Benchmark (OGB), which provide graph-structured data with labeled entities and relationships.

In some examples, index graph 720 can be generated by first "chunking" the documents 440A . . . N into text chunks of a predetermined length. The graph LLM 705 can be instructed, using a suitable prompt, to extract entities, relationships, claims (e.g., factual assertions), or other elements from the chunked documents 440A . . . N.

The index graph 720 can then be constructed by representing the extracted elements as nodes and defining edges between them based on their relationships or interactions. For example, each node in the graph can represent a distinct extracted entity, relationship, or claim. For instance, an entity node might correspond to a specific person, place, or concept; a relationship node might capture connections like "authored by" or "located in;" and a claim node might encapsulate a factual assertion such as "Alice is the project director."

Edges between nodes can be created based on the relationships identified by the graph LLM 705 during the extraction process. For instance, an edge might connect an entity node representing a person to a claim node if the person is the subject of the claim, or between two entities if they share a direct relationship (e.g., two individuals who collaborated on a project together). The edges may also carry weights to quantify the strength, confidence, or relevance of the relationship, which could be determined by factors such as the frequency of occurrence in the text, the confidence score assigned by the graph LLM 705, or the contextual proximity of the entities in the original document. In some examples, higher-levels of organization with the index graph 720 can be constructed by detecting "communities" of related entities and relationships within the index graph 720. Each community can be summarized by graph LLM 705 to produce a concise representation of the key information, which may be referred to as a "community summary."

Use of the index graph 720 can then facilitate graph queries based on the query 435. In some examples, the index graph 720 can be optimized by partitioning the index graph 720 using a community detection algorithm such as the Leiden algorithm. The index graph 720 can be queried by graph search component 705 using a suitable retrieval mechanism such as a semantic graph-based search algorithm given query 435. The graph search component 705 outputs a number of triplets 715 (e.g., an entity, a relationship, and a claim) which together constitute graph 507. The graph generation subsystem 505 can combine the triplets 715 to represent the graph using a suitable data structure such as a JSON object that can be included in the context window for LLM 430 along with the query 435 and other augmentations. In some examples, the graph search component 705 can include additional graph details such as edge weighting, other hierarchical relationships, or multi-relational nodes.

Figure 8A:
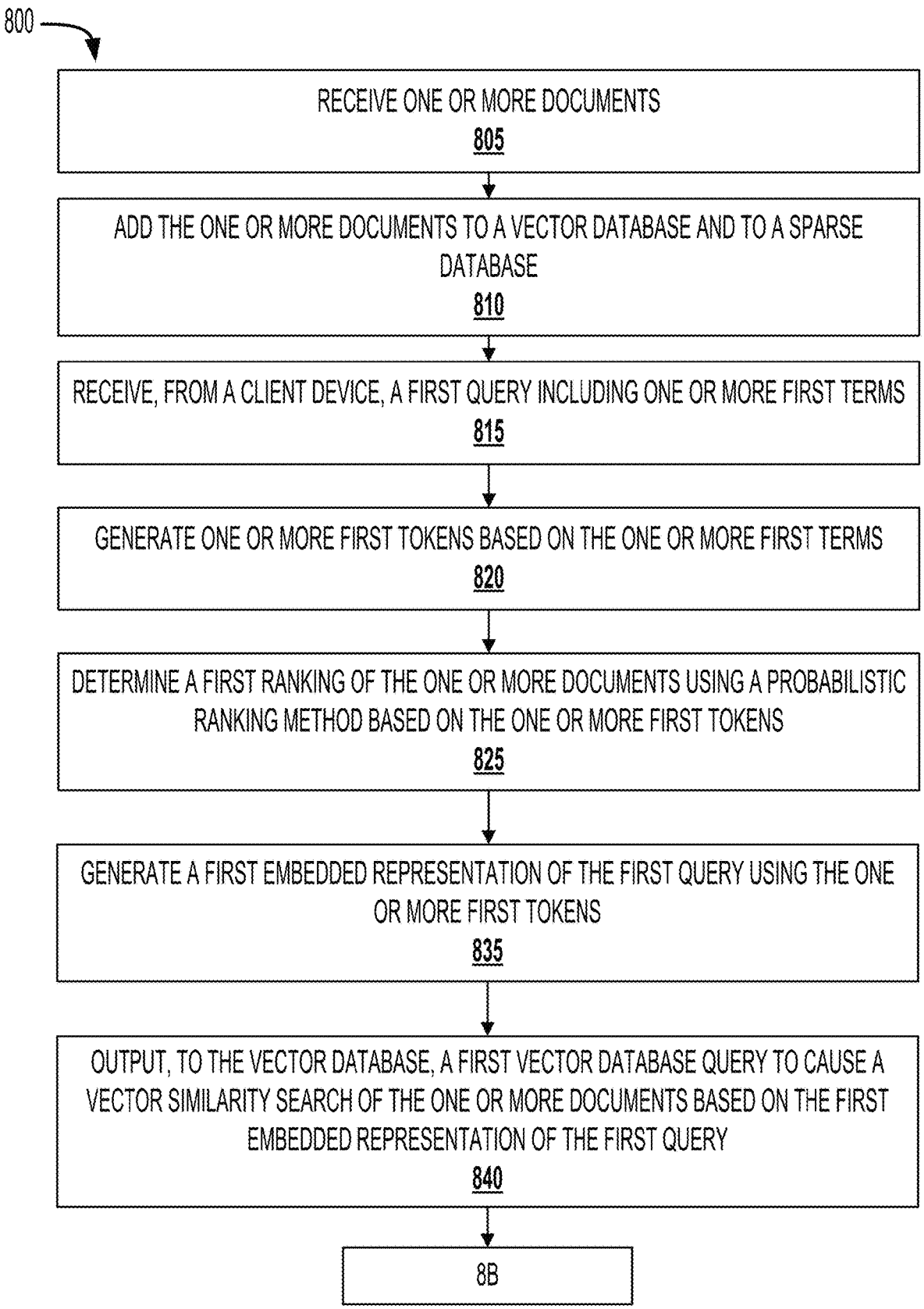
FIG. 8A-8B show a flowchart of a method describing one example implementation of hybrid RAG for rich document queries using an LLM, according to some aspects of the present disclosure.
Figure 8B:
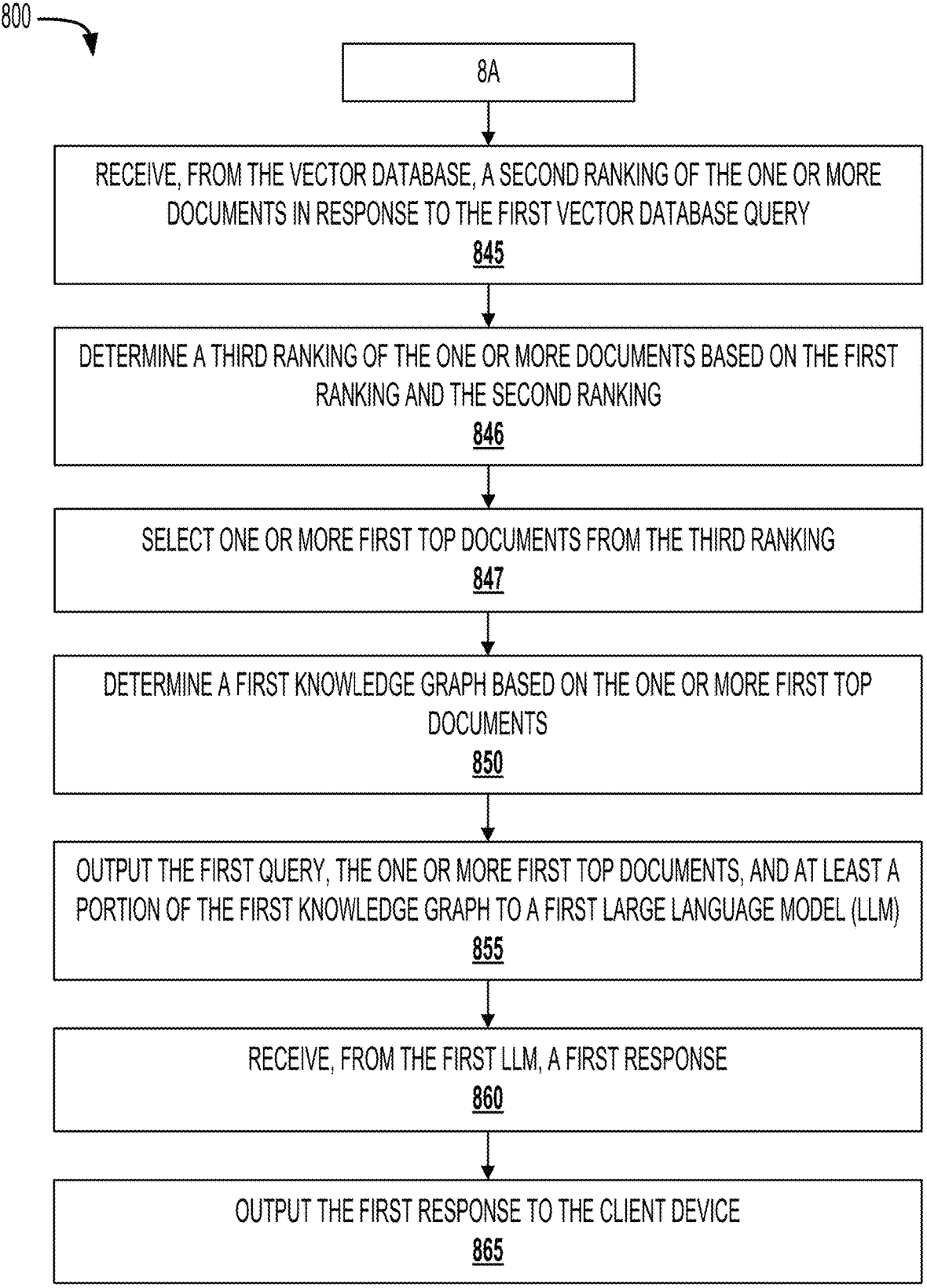

Referring now to FIG. 8, FIG. 8 shows a flowchart of a method 800 describing one example implementation of hybrid RAG for rich document queries using an LLM, according to some aspects of the present disclosure. The description of the method 800 in FIG. 8 will be made with reference to FIGS. 4-7, however any suitable system according to this disclosure may be used, such as the example systems 100 and 200, shown in FIGS. 1 and 2 or systems that do not involve video conferencing or a video conference provider. It should be appreciated that method 800 provides a particular method for providing RAG for rich document queries using an LLM. Other sequences of operations may also be performed according to alternative examples. For example, alternative examples of the present disclosure may perform the steps outlined below in a different order. Moreover, the individual operations illustrated by method 800 may include multiple sub-operations that may be performed in various sequences as appropriate to the individual operation. Furthermore, additional operations may be added or removed depending on the particular applications. Further, the operations described in method 800 may be performed by different devices. For example, the description is given from the perspective of the query processing subsystem 420 but other configurations are possible. One of ordinary skill in the art would recognize many variations, modifications, and alternatives.

The method 800 may include block 805. At block 805, a computing system, such as the query processing subsystem 420 receives one or more documents 440A . . . N. For example, the documents 440A . . . N may be a corpus of documents related to a particular subject matter, organization, account, time period, etc. The documents 440A . . . N may be selected as a foundation for querying the query processing subsystem 420. For instance, the query processing subsystem 420 may provide response-generation services for a chat-based query/response system such as an "AI companion" that is provided for answering questions relating to a corpus of documents.

At block 810, the computing system adds the one or more documents 440A . . . N to a vector database 520 and a sparse database 522. For example, the computing system can preprocess the documents 440A . . . N by dividing them into smaller, semantically meaningful chunks using a component such as chunking subsystem 525 shown in FIG. 5 above. Each chunk of each respective document of the documents 440A . . . N can be represented as a high-dimensional embedded representation. The vectorized chunks can be ingested into the vector database 520 using a prescribed "extract, transform, load" ("ETL") pipeline provided by the vector database 520 provider. In some examples, the ETL process can generate the embedded representation of each chunk and index each respective chunk using a suitable indexing scheme amenable to efficient vector search, including generation of an associated document identifier for each document or document chunk. For instance, the vectorized chunks can be added to data structures (e.g., graph-based or tree-based data structures) that enable efficient retrieval and similarity search based on geometric proximity.

The vectorized chunks can likewise be ingested into the sparse database 522 using a prescribed ETL pipeline provided by the vector database 522 provider. As mentioned above, the sparse database 522 can be any suitable database for use in conjunction with a probabilistic ranking method such as BM25, such as an inverted index database, a key-value store, or a document-oriented database. For example, ingesting the vectorized chunks to an inverted index database in preparation for use with a probabilistic ranking algorithm may involve processing each chunk to extract terms or phrases, computing term frequencies for indexing, and other processes for generating relevant metadata. Additionally, metadata such as document length, term positions, or inverse document frequency can be calculated and stored to support efficient scoring by the probabilistic ranking method such as BM25.

At block 815, the computing system, receives, from a client device, a first query including one or more first terms. The one or more first terms can include words that are part of the phrases or sentences used in the first query. In some examples, the first terms may be limited to words, phrases, or punctuation with a threshold level of semantic meaning. For instance, the query "Hey AI companion, remind me when the next quarterly meeting is or whatever it's called these days," includes a number of words and punctuation that are not semantically relevant for determining a response (e.g., "Hey AI companion").

A client device such as client device 408 or 410 of system 400 of FIG. 4 can be used to input a query 435 about the documents 440A . . . N or a related subject matter contained therein. For instance, the documents 440A . . . N may be a collection of documents about an organization such as employee records, organizational guidelines or rules, calendars, business plans, product designs, and so on. In this example, the query 435 may be related to these documents. For example, an employee could ask "What will the company be focused on next quarter?" Such a broad-ranging question can be answered by drawing from various sources, but the quantity of documents is typically far greater than the context window of the downstream LLM. The innovations of this disclosure can use RAG as well as other components to narrow and focus the information included in the context window, including information from longitudinal multi-session interactions.

At block 820, the computing system generates one or more first tokens based on the one or more first terms. For example, a tokenization subsystem or similar component included in the hybrid RAG subsystem 425 of FIGS. 4 and 5 can be used to identify the first terms that have significant semantic value. In some examples, an LLM or other language can be prompted to determine the first terms. In the example above, the first terms may be "next quarterly meeting." Additional first terms can be included to include implicit query details such as the identity of the query author, time or date, location, and so on. The first terms can be tokenized by converting them into discrete units such as words or subwords, in accordance with the configuration of a selected tokenization algorithm. For instance, the first terms "next quarterly meeting" could be tokenized as ["next," "quarterly," "meeting"] using a whitespace-based tokenization algorithm or as ["next," "quarter," "##ly," "meeting"] using a subword tokenization algorithm. In this example, the subword tokenization algorithm outputs hash marks (e.g., "##") to indicate that the token is a subword continuation, indicating that it must follow a preceding token to form a complete word.

Two ranking methods can be performed in parallel, and the resultant rankings can be combined at block 846. Block 825 describes the first ranking method and blocks 835-845 describe the second ranking method. Other ranking methods could likewise be used in parallel or in sequence, along with or instead of the methods described in method 800. At block 825, the computing system determines a first ranking of the one or more documents using a probabilistic ranking method based on the one or more first tokens. For example, a probabilistic ranking method such as BM25 can be implemented by the retrieval subsystem 515 of FIG. 5 and can be used to evaluate the relevance of the documents 440A . . . N using a suitable query against the sparse database 522 based on the one or more first tokens. In this example, BM25 can assign scores to develop the first ranking by comparing token occurrences returned along with documents or document chunks from documents 440A . . . N and accounting for factors such as term frequency, term frequency across all documents (or the inverse thereof), or document length. The probabilistic ranking method can be used to generate the first ranking of the documents 440A . . . N in which a higher ranking corresponds to documents more likely to match the query intent.

At block 835, the computing system generates a first embedded representation of the first query using the one or more first tokens. For example, the computing system can generate the first embedded representation by inputting the one or more first tokens into a pre-trained embedding model included in the retrieval subsystem 515, such as a transformer-based neural network. The embedding model can map the tokens into a high-dimensional vector space. For instance, the tokens ["next," "quarterly," "meeting"] may be transformed into a 768-dimensional vector using a Bidirectional Encoder Representations from Transformers ("BERT")-based model. Other non-limiting examples of embedding models include various BERT variants such as RoBERTa, DistilBERT, and ALBERT, Word2Vec, or GloVe.

In some examples, the first embedded representation of the first query can be generated by averaging token embeddings into a single dense vector representation. For example, the embedding model may output one or more token embeddings given the one or more tokens as input. Then a vector representation for the first query can be generated by computing a single dense vector representation by averaging the one or more token embeddings. This can be effected by, for example, computing the element-wise mean of the token embeddings across all dimensions of the embedding space.

At block 840, the computing system outputs, to the vector database, a first vector database query to cause a vector similarity search of the one or more first relevant documents based on the first embedded representation of the first query. For example, the first vector database query can be constructed according to a format prescribed by the API provided by the vector database 520, such as web-based REST API. The vector database 520 can be caused, by the first vector database query, to execute a vector similarity search, such as cosine similarity or Euclidean distance, to identify documents or document chunks with embedded vector representations closest to the query vector. For instance, the first embedded representation of the first query can be matched against pre-indexed document or document chunk vectors, retrieving those with the smallest cosine distance, which can correspond to the most semantically relevant documents.

At block 845, the computing system receives, from the vector database, a second ranking of the one or more documents in response to the first vector database query. For example, the vector database query can be configured to limit the number of documents or document chunks returned, as well as to require that the returned chunks be ranked according to relevance or other suitable criteria. The vector database query can be further limited in accordance with information derived from the query 425 to further restrict results, such as limiting documents within a specific timeframe or matching particular metadata attributes, to further improve the relevance of the returned documents.

At block 846, the computing system determines a third ranking of the one or more documents based on the first ranking and the second ranking. For example, a re-ranking algorithm or component (e.g., re-ranking subsystem 519) can be used to combine the first and second rankings to develop a third ranking. For example, the re-ranking subsystem 519 of FIG. 5 can combine the first and second rankings by applying a weighted scoring model in which scores from each ranking are normalized and aggregated based on predefined weights. In another example, the re-ranking subsystem 519 of FIG. 5 can use an ML model trained to prioritize documents by considering features from both rankings, such as vector similarity, term relevance, contextual metadata, and so on.

At block 847, the computing system selects one or more first top documents from the third ranking. For example, from third ranking of documents or document chunks identified in block 846, the computing system can select a top subset that are most relevant. The size of the third ranking and the size of the one or more first top documents can be selected, along with the document chunk size, to fit in the context window of the LLM 430 of FIG. 4. In some examples, the size of the returned first top documents can be assessed at query time and a smaller subset can be selected based on constraints relating to the size of the context window. In some examples, the one or more first top documents are the output of the base RAG implementation shown in FIG. 5.

At block 850, the computing system determines a first knowledge graph based on the one or more first top documents. In this block, in addition to the one or more first top documents identified in the operations above, additional information is generated to be added to the context window. For example, the graph generation subsystem 505 can be used to generation the knowledge graph 507 based on the query 435 and the documents 440A . . . N. As detailed in FIG. 7 above, the graph generation subsystem 505 can be initialized by generating the index graph 720 which can be efficiently searched used the query 435. In this example, the one or more first top documents can be specified at the graph search 705 to constrain the scope of the graph search. The graph search component 705 can output a number of triplets 715 (e.g., an entity, a relationship, and a claim) which can be assembled to generate graph 507. The graph 507 can be represented using a suitable data structure such as a JSON object that can be included in the context window for LLM 430 along with the query 435, the RAG results received in block 845, and other additional information such as the session memory described in FIGS. 6 and 9.

At block 855, the computing system outputs the first query, the one or more first top documents, and at least a portion of the first knowledge graph to a first LLM. The first LLM, such as LLM 430, can be accessed using an API such as a web-based REST API or programmatic API. The API may include a field for a prompt. The contents of the prompt, along with the response, constitute the context window for the first LLM. To improve the response that would be generated using the query alone, the information identified or generated in this method 800 above is added to the prompt to provide context for generating the response 445. The method 900 of FIG. 9 below includes techniques for generating additional information based on numerous or multi-session interactions. In some examples, the combination of the first query, the one or more first top documents, and the first knowledge graph to a first LLM may together exceed the size of the available context window. In that case the hybrid RAG subsystem 425 can truncate certain elements. For instance, a portion of the first knowledge graph can be selected using a query to LLM 430 or another LLM or other method.

At block 860, the computing system receives, from the first LLM, a first response. The first LLM, in the context of the first query, the one or more first top documents, and the at least a portion of the first knowledge graph to a first LLM, generates response 445. The response 445 can be, for example, received as a HTTP response to the web-based API query described in block 855. Because the response 445 itself can contribute to the context window, certain elements included in the LLM prompt may be truncated to preserve space for an adequate response.

At block 865, the computing system outputs the first response to the client device. For example, the response 445 can be relayed to the client device 408 or 410 that output the query received in block 805. The client device can, for example, output the response to a chat-based interface used to input the query 435 to give the user of the client device the subjective experience of conversing with a virtual assistant. The client device can be triggered by the response 445 to perform additional actions, such as scheduling, generation of reminders, or workflow automation based on the response 445. In some examples, the response 445 can be archived or indexed using a document management system for future retrieval or auditing purposes. For instance, the response 445 may be added to the documents 440A . . . N. Receipt of the response 445 by the client device can cause a notification, alarm, or alert to be generated and output by the client device and/or the video conference provider 402.

Figure 9:
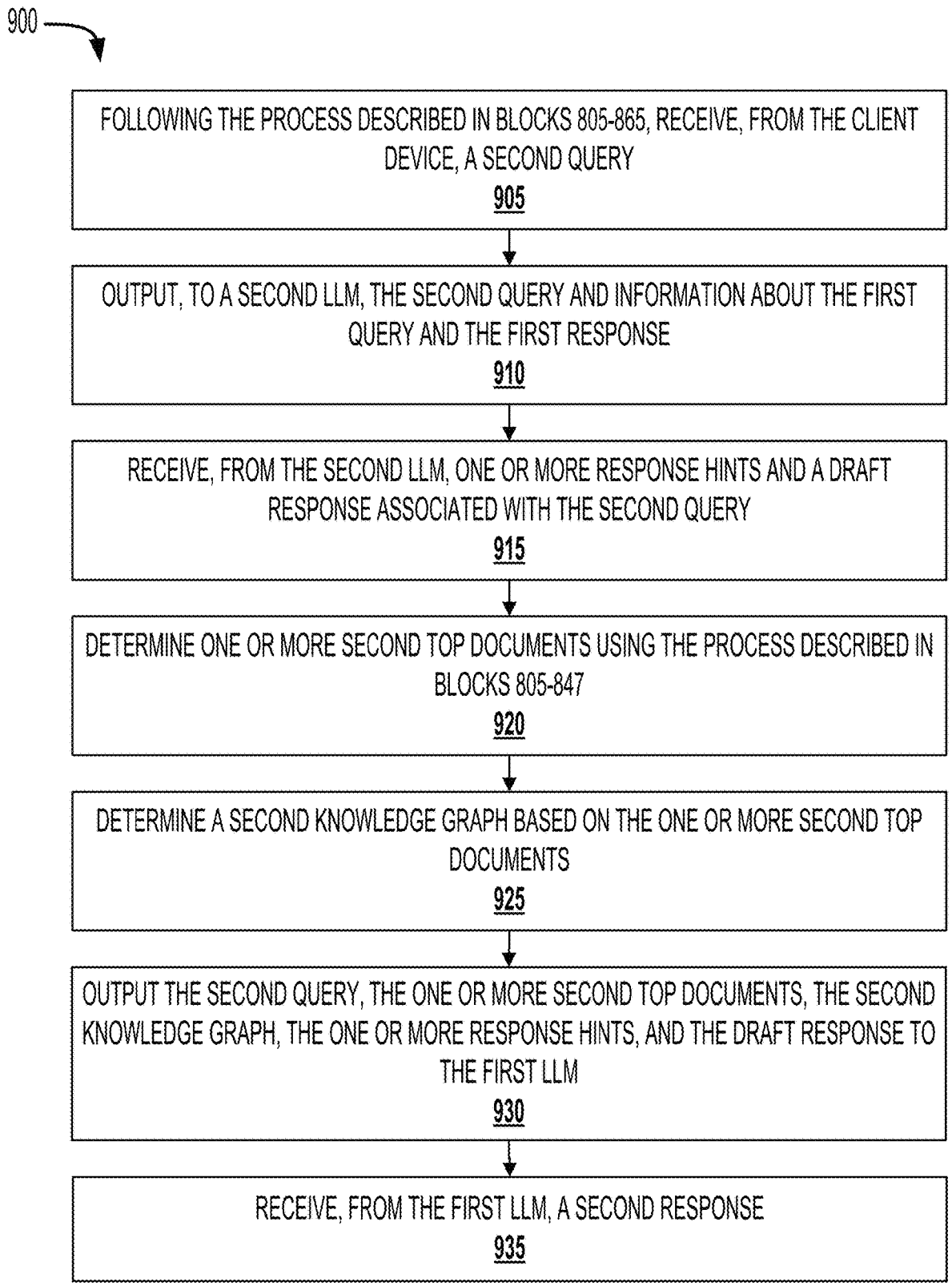
FIG. 9 shows a flowchart of a method including additional operations for the example implementation of hybrid RAG for rich document queries using an LLM described in method, according to some aspects of the present disclosure.

Referring now to FIG. 9, FIG. 9 shows a flowchart of a method 900 including additional operations for the example implementation of hybrid RAG for rich document queries using an LLM described in method 800, according to some aspects of the present disclosure. The description of the method 900 in FIG. 9 will be made with reference to FIGS. 4-7, however any suitable system according to this disclosure may be used, such as the example systems 100 and 200, shown in FIGS. 1 and 2. It should be appreciated that method 900 provides a particular method for providing RAG for rich document queries using an LLM. Other sequences of operations may also be performed according to alternative examples. For example, alternative examples of the present disclosure may perform the steps outlined below in a different order. Moreover, the individual operations illustrated by method 900 may include multiple sub-operations that may be performed in various sequences as appropriate to the individual operation. Furthermore, additional operations may be added or removed depending on the particular applications. Further, the operations described in method 900 may be performed by different devices. For example, the description is given from the perspective of the query processing subsystem 420 but other configurations are possible. One of ordinary skill in the art would recognize many variations, modifications, and alternatives.

The method 900 may include block 905. At block 905, a computing system, following the process described in blocks 805-865, receives, from the client device, a second query. For example, consider a first query such as "Remind me when the next quarterly meeting is." Such as query may result in the identification of a number of documents such as organizational calendars or plans. The query may also result in generation of a knowledge graph showing the relationship between different organizational entities (e.g., executives or managers), subordinates, products, and so on. These elements, or portions thereof, as well as the query 435 and the response, together constitute the session information 610 and previous queries and responses 615 shown in FIG. 6.

In this block, a second query is received that may be a "follow on" query that builds on the answer to the previous query. While this is not required, the techniques exemplified in this process are most effective when the session information 610 and the previous queries and responses 615 can contribute to the generation of subsequent responses. For example, the second query may be "What do you expect to be discussed at the next quarterly meeting?" Such as query can be answered in the context of the session information 610 and previous queries and responses 615 as well as other information such the hints 512 and draft answer 514 as discussed below.

At block 910, the computing system outputs, to a second LLM, the second query and information about the first query and the first response. As shown in FIG. 6, the memory LLM 605, via the tokenizer 625, can receive the second query and the information about the first query and the first response, such as the session information 610 and previous queries and responses 615. The memory LLM 605 can be prompted to generate the hints 512 and draft answer 514 in this provided context. In this respect, the memory LLM 605 and other components of the session memory subsystem 510 can enable longitudinal, long-term, or multi-session "memory" of the interactions with the LLM 430. Moreover, because the memory LLM 605 can be selected for optimized for providing a large context window, the hints 512 and draft answer 514 can be generated in the context of the full or s substantial subset of the corpus of documents 440A . . . N, which can enable generation of hints 512 and draft answer 514 using a more fulsome context than may be available to LLM 430 with a more limited context window.

At block 915, the computing system receives, from the second LLM, one or more response hints and a draft response associated with the second query. For example, the hints 512 for the example follow-on query "What do you expect to be discussed at the next quarterly meeting?" may include information about the time, date, attendees, location, media, and so on about the next quarterly meeting determined while answering the first query. The draft answer 514 can be an attempt by memory LLM 605 to generate a response to the second query using the session information 610 and previous queries and responses 615, as well as the tokenized documents 440A . . . N without the benefit of a RAG implementation or the knowledge graph, as described above in the process 800 of FIG. 8.

In effect, the one or more response hints can represent long-term memory across multiple interactions, including the first query, the first response, the second query, and the second response, as well as any number of query/response cycles across any number of sessions. Sessions may be separated by various amounts of inactivity (e.g., minutes, hours, days, weeks, etc.). Session data can be maintained using a suitable session tracking method such as an in-memory or persisted cache that stores session-specific information, such as user context or query history, indexed by a unique session identifier. For example, an in-memory cache such as Redis or a database-backed solution like DynamoDB can be used to store and retrieve session data.

At block 920, the computing system determines one or more second top documents using the process described in blocks 805-847.

At block 925, the computing system determines a second knowledge graph based on the one or more second top documents. This block can proceed substantially as block 850 as described above with respect to block 850.

At block 930, the computing system outputs the second query, the one or more second top documents, the second knowledge graph, the one or more response hints, and the draft response to the first LLM. This block can proceed substantially as block 850 as described above with respect to block 855 except that the hints 512 and draft answer 514 are now included in the context window, further improving response accuracy and efficacy.

An example prompt including a query, top documents, one or more knowledge graphs (or a portion thereof), the response hints, and a draft response is give by:

Query:
{{query}}
Most Relevant Documents:
{{top_documents}}
Draft Response
{{draft_response}}
Hints
{{hints}}
Knowledge Graph
{{json_graph}}
Instructions:

Generate a response to the query in the context of the relevant document portions provided. Use the draft response as a starting point. Base statements about entities and their relationships found in the query on the knowledge graph provided. Also consider the hints when generating your answer. While the draft response and hints should inform your response, you may deviate from them as needed based on the relevant documents and knowledge graph.

In this example, the elements shown as "{{variable}}" indicate placeholder variables which the hybrid RAG subsystem 425 can replace with information such as the second query, the one or more second top documents, the second knowledge graph, the one or more response hints, or the draft response. Other approaches for templates, placeholders, and prompt generation may be used to similar effect. While the example shown above is shown using human-readable text, in some examples, the generated prompt may be a tokenized or embedded representation that is interpretable by the LLM 430 but not necessarily human-readable.

At block 935, the computing system receives, from the first LLM, a second response. This block can proceed substantially as block 850 as described above with respect to block 860.

Figure 10:
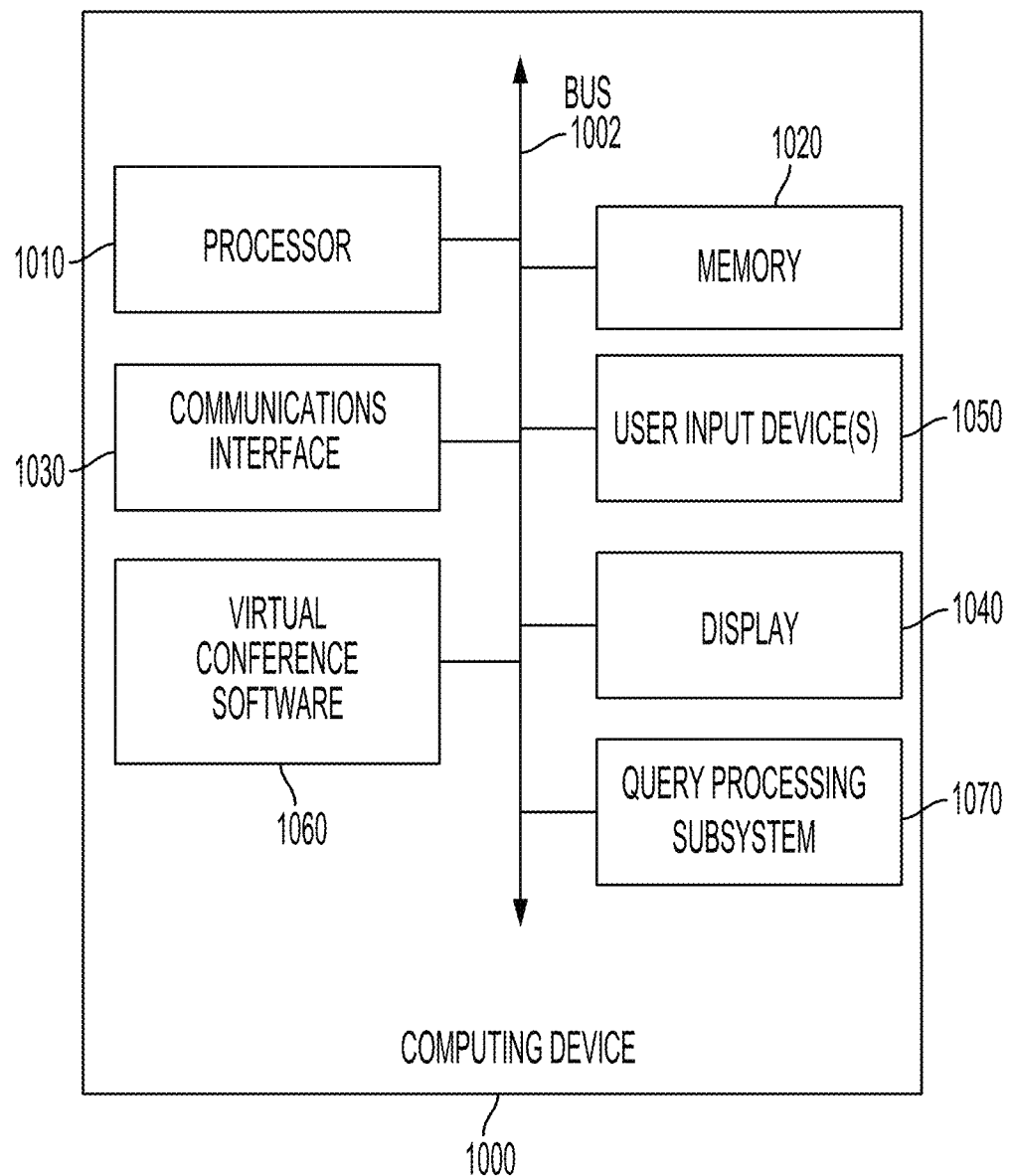
FIG. 10 shows an example computing device suitable for use in example systems or methods for providing hybrid RAG for rich document queries using an LLM, according to some examples of the present disclosure.

Referring now to FIG. 10, FIG. 10 shows an example computing device 1000 suitable for use in example systems or methods for providing hybrid RAG for rich document queries using an LLM, according to some examples of the present disclosure. The example computing device 1000 includes a processor 1010 which is in communication with the memory 1020 and other components of the computing device 1000 using one or more communications buses 1002, including the query processing subsystem 1070. The query processing subsystem 1070 may be similar to the query processing subsystem 420 as described above. The processor 1010 is configured to execute processor-executable instructions stored in the memory 1020 to perform one or more methods for hybrid RAG for rich document queries using an LLM according to different examples, such as part or all of the example methods 800 and 900 described above with respect to FIGS. 8 and 9. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes virtual conferencing software 1060 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving one or more documents; adding the one or more documents to a vector database; adding the one or more documents to a sparse database; receiving, from a client device, a first query including one or more first terms; generating one or more first tokens based on the one or more first terms; determining a first ranking of the one or more documents using a probabilistic ranking method based on the one or more first tokens; generating a first embedded representation of the first query using the one or more first tokens; outputting, to the vector database, a first vector database query to cause a vector similarity search of the one or more documents based on the first embedded representation of the first query; receiving, from the vector database, a second ranking of the one or more documents in response to the first vector database query; determining a third ranking of the one or more documents based on the first ranking and the second ranking; selecting one or more first top documents from the third ranking; determining a first knowledge graph based on the one or more first top documents; outputting the first query, the one or more first top documents, and at least a portion of the first knowledge graph to a first large language model ("LLM"); receiving, from the first LLM, a first response; and outputting the first response to the client device.

Example 2 is the method of example(s) 1, further comprising: receiving, from the client device, a second query including one or more second terms; outputting, to a second LLM, the second query and information about the first query and the first response; receiving, from the second LLM, one or more response hints and a draft response associated with the second query; generating one or more second tokens based on the one or more second terms; determining a fourth ranking of the one or more documents using the probabilistic ranking method based on the one or more second tokens; generating a second embedded representation of the second query using the one or more second tokens; outputting, to the vector database, a second vector database query to cause a second vector similarity search of the one or more documents based on the second embedded representation of the second query; receiving, from the vector database, a fifth ranking of the one or more documents in response to the second vector database query; determining a sixth ranking of the one or more documents based on the fourth ranking and the fifth ranking; selecting one or more second top documents from the sixth ranking; determining a second knowledge graph based on the one or more second top documents; outputting the second query, the one or more second top documents, the second knowledge graph, the one or more response hints, and the draft response to the first LLM; and receiving, from the first LLM, a second response.

Example 3 is the method of example(s) 2, wherein the one or more response hints represent long-term memory across a plurality of interactions, include the first query, the first response, the second query, and the second response.

Example 4 is the method of example(s) 2, wherein: the first query and the first response occur during a first user session of the client device; and the second query and the second response occur during a second user session of the client device.

Example 5 is the method of example(s) 1, wherein adding the one or more documents to the vector database comprises: for each document of the one or more documents: generating one or more document portions; generating a set of embedded document portion representations based on the one or more document portions; and for each embedded document portion representation of the set of embedded document portion representations, outputting, to the vector database, the embedded document portion representation and an associated document identifier.

Example 6 is the method of example(s) 1, wherein the probabilistic ranking method is a best matching ("BM") ranking function.

Example 7 is the method of example(s) 6, wherein the BM ranking function is BM25.

Example 8 is the method of example(s) 1, wherein generating the first embedded representation of the first query using the one or more first tokens comprises: outputting the one or more first tokens to a pre-trained machine-learning ("ML") model based on a Bidirectional Encoder Representations from Transformers (BERT) model; receiving, from the ML model, one or more token embeddings; and generating the first embedded representation of the first query by averaging the one or more token embeddings into a single dense vector representation.

Example 9 is the method of example(s) 1, wherein determining the first knowledge graph based on the one or more first top documents comprises: generating a set of embedded document representations based on the one or more documents; determining a plurality of entities from the set of embedded document representations, the plurality of entities including at least one relationship between a first entity and a second entity; and constructing the first knowledge graph, wherein each entity of the plurality of entities is represented by a node, and the at least one relationship is represented by an edge between the first entity and the second entity.

Example 10 is the method of example(s) 1, wherein determining the first knowledge graph based on the one or more first top documents comprises: outputting, to a graph database, a second query using information about the one or more first top documents; and receiving, from the graph database, the first knowledge graph.

Example 11 is the method of example(s) 1, wherein the first query, the one or more first top documents, and the first knowledge graph include structured information and unstructured information.

Example 12 is a non-transitory computer-readable storage medium storing processor-executable instructions configured to cause one or more processors to: receive one or more documents; add the one or more documents to a vector database; add the one or more documents to a sparse database; receive, from a client device, a first query include one or more first terms; generate one or more first tokens based on the one or more first terms; determine a first ranking of the one or more documents use a probabilistic ranking method based on the one or more first tokens; generate a first embedded representation of the first query using the one or more first tokens; output, to the vector database, a first vector database query to cause a vector similarity search of the one or more documents based on the first embedded representation of the first query; receive, from the vector database, a second ranking of the one or more documents in response to the first vector database query; determine a third ranking of the one or more documents based on the first ranking and the second ranking; select one or more first top documents from the third ranking; determine a first knowledge graph based on the one or more first top documents; output the first query, the one or more first top documents, and at least a portion of the first knowledge graph to a first LLM; receive, from the first LLM, a first response; and output the first response to the client device.

Example 13 is the non-transitory computer-readable storage medium of example(s) 12, storing additional processor-executable instructions configured to cause the one or more processors to: receive, from the client device, a second query include one or more second terms; output, to a second LLM, the second query and information about the first query and the first response; receive, from the second LLM, one or more response hints and a draft response associated with the second query; generate one or more second tokens based on the one or more second terms; determine a fourth ranking of the one or more documents using the probabilistic ranking method based on the one or more second tokens; generate a second embedded representation of the second query using the one or more second tokens; output, to the vector database, a second vector database query to cause a second vector similarity search of the one or more documents based on the second embedded representation of the second query; receive, from the vector database, a fifth ranking of the one or more documents in response to the second vector database query; determine a sixth ranking of the one or more documents based on the fourth ranking and the fifth ranking; select one or more second top documents from the sixth ranking; determine a second knowledge graph based on the one or more second top documents; output the second query, the one or more second top documents, the second knowledge graph, the one or more response hints, and the draft response to the first LLM; and receive, from the first LLM, a second response.

Example 14 is the non-transitory computer-readable storage medium of example(s) 13, wherein the one or more response hints represent long-term memory across a plurality of interactions, include the first query, the first response, the second query, and the second response.

Example 15 is the non-transitory computer-readable storage medium of example(s) 13, wherein: the first query and the first response occur during a first user session of the client device; and the second query and the second response occur during a second user session of the client device.

Example 16 is a system comprising: one or more non-transitory computer-readable media; and one or more processors communicatively coupled to the one or more non-transitory computer-readable media, the one or more processors configured to execute processor-executable instructions stored in the non-transitory computer-readable media to: receive one or more documents; add the one or more documents to a vector database; add the one or more documents to a sparse database; receive, from a client device, a first query include one or more first terms; generate one or more first tokens based on the one or more first terms; determine a first ranking of the one or more documents use a probabilistic ranking method based on the one or more first tokens; generate a first embedded representation of the first query using the one or more first tokens; output, to the vector database, a first vector database query to cause a vector similarity search of the one or more documents based on the first embedded representation of the first query; receive, from the vector database, a second ranking of the one or more documents in response to the first vector database query; determine a third ranking of the one or more documents based on the first ranking and the second ranking; select one or more first top documents from the third ranking; determine a first knowledge graph based on the one or more first top documents; output the first query, the one or more first top documents, and at least a portion of the first knowledge graph to a first LLM; receive, from the first LLM, a first response; and output the first response to the client device.

Example 17 is the system of example(s) 16, further comprising additional processor-executable instructions stored in the non-transitory computer-readable media to: receive, from the client device, a second query include one or more second terms; output, to a second LLM, the second query and information about the first query and the first response; receive, from the second LLM, one or more response hints and a draft response associated with the second query; generate one or more second tokens based on the one or more second terms; determine a fourth ranking of the one or more documents using the probabilistic ranking method based on the one or more second tokens; generate a second embedded representation of the second query using the one or more second tokens; output, to the vector database, a second vector database query to cause a second vector similarity search of the one or more documents based on the second embedded representation of the second query; receive, from the vector database, a fifth ranking of the one or more documents in response to the second vector database query; determine a sixth ranking of the one or more documents based on the fourth ranking and the fifth ranking; select one or more second top documents from the sixth ranking; determine a second knowledge graph based on the one or more second top documents; output the second query, the one or more second top documents, the second knowledge graph, the one or more response hints, and the draft response to the first LLM; and receive, from the first LLM, a second response.

Example 18 is the system of example(s) 17, wherein the one or more response hints represent long-term memory across a plurality of interactions, include the first query, the first response, the second query, and the second response.

Example 19 is the system of example(s) 17, wherein: the first query and the first response occur during a first user session of the client device; and the second query and the second response occur during a second user session of the client device.

Example 20 is the system of example(s) 16, wherein the first query, the one or more first top documents, and the first knowledge graph include structured information and unstructured information.

That which is claimed is:
1. A method, comprising:
receiving one or more documents;
adding the one or more documents to a vector database;
adding the one or more documents to a sparse database;
receiving, from a client device, a first query including one or more first terms;
generating one or more first tokens based on the one or more first terms;
determining a first ranking of the one or more documents using a probabilistic ranking method based on the one or more first tokens;
generating a first embedded representation of the first query using the one or more first tokens;
outputting, to the vector database, a first vector database query to cause a vector similarity search of the one or more documents based on the first embedded representation of the first query;
receiving, from the vector database, a second ranking of the one or more documents in response to the first vector database query;
determining a third ranking of the one or more documents based on the first ranking and the second ranking;
selecting one or more first top documents from the third ranking;
determining a first knowledge graph based on the one or more first top documents;

outputting the first query, the one or more first top documents, and at least a portion of the first knowledge graph to a first large language model ("LLM");
receiving, from the first LLM, a first response; and
outputting the first response to the client device.

2. The method of claim 1, further comprising:
receiving, from the client device, a second query including one or more second terms;
outputting, to a second LLM, the second query and information about the first query and the first response;
receiving, from the second LLM, one or more response hints and a draft response associated with the second query;
generating one or more second tokens based on the one or more second terms;
determining a fourth ranking of the one or more documents using the probabilistic ranking method based on the one or more second tokens;
generating a second embedded representation of the second query using the one or more second tokens;
outputting, to the vector database, a second vector database query to cause a second vector similarity search of the one or more documents based on the second embedded representation of the second query;
receiving, from the vector database, a fifth ranking of the one or more documents in response to the second vector database query;
determining a sixth ranking of the one or more documents based on the fourth ranking and the fifth ranking;
selecting one or more second top documents from the sixth ranking;
determining a second knowledge graph based on the one or more second top documents;
outputting the second query, the one or more second top documents, the second knowledge graph, the one or more response hints, and the draft response to the first LLM; and
receiving, from the first LLM, a second response.

3. The method of claim 2, wherein the one or more response hints represent long-term memory across a plurality of interactions, include the first query, the first response, the second query, and the second response.

4. The method of claim 2, wherein:
the first query and the first response occur during a first user session of the client device; and
the second query and the second response occur during a second user session of the client device.

5. The method of claim 1, wherein adding the one or more documents to the vector database comprises:
for each document of the one or more documents:
generating one or more document portions;
generating a set of embedded document portion representations based on the one or more document portions; and
for each embedded document portion representation of the set of embedded document portion representations, outputting, to the vector database, the embedded document portion representation and an associated document identifier.

6. The method of claim 1, wherein the probabilistic ranking method is a best matching ("BM") ranking function.

7. The method of claim 6, wherein the BM ranking function is BM25.

8. The method of claim 1, wherein generating the first embedded representation of the first query using the one or more first tokens comprises:

outputting the one or more first tokens to a pre-trained machine-learning ("ML") model based on a Bidirectional Encoder Representations from Transformers (BERT) model;
receiving, from the ML model, one or more token embeddings; and
generating the first embedded representation of the first query by averaging the one or more token embeddings into a single dense vector representation.

9. The method of claim 1, wherein determining the first knowledge graph based on the one or more first top documents comprises:
generating a set of embedded document representations based on the one or more documents;
determining a plurality of entities from the set of embedded document representations, the plurality of entities including at least one relationship between a first entity and a second entity; and
constructing the first knowledge graph, wherein each entity of the plurality of entities is represented by a node, and the at least one relationship is represented by an edge between the first entity and the second entity.

10. The method of claim 1, wherein determining the first knowledge graph based on the one or more first top documents comprises:
outputting, to a graph database, a second query using information about the one or more first top documents; and
receiving, from the graph database, the first knowledge graph.

11. The method of claim 1, wherein the first query, the one or more first top documents, and the first knowledge graph include structured information and unstructured information.

12. A non-transitory computer-readable storage medium storing processor-executable instructions configured to cause one or more processors to:
receive one or more documents;
add the one or more documents to a vector database;
add the one or more documents to a sparse database;
receive, from a client device, a first query include one or more first terms;
generate one or more first tokens based on the one or more first terms;
determine a first ranking of the one or more documents use a probabilistic ranking method based on the one or more first tokens;
generate a first embedded representation of the first query using the one or more first tokens;
output, to the vector database, a first vector database query to cause a vector similarity search of the one or more documents based on the first embedded representation of the first query;
receive, from the vector database, a second ranking of the one or more documents in response to the first vector database query;
determine a third ranking of the one or more documents based on the first ranking and the second ranking;
select one or more first top documents from the third ranking;
determine a first knowledge graph based on the one or more first top documents;
output the first query, the one or more first top documents, and at least a portion of the first knowledge graph to a first LLM;
receive, from the first LLM, a first response; and
output the first response to the client device.

13. The non-transitory computer-readable storage medium of claim 12, storing additional processor-executable instructions configured to cause the one or more processors to:

receive, from the client device, a second query include one or more second terms;

output, to a second LLM, the second query and information about the first query and the first response;

receive, from the second LLM, one or more response hints and a draft response associated with the second query;

generate one or more second tokens based on the one or more second terms;

determine a fourth ranking of the one or more documents using the probabilistic ranking method based on the one or more second tokens;

generate a second embedded representation of the second query using the one or more second tokens;

output, to the vector database, a second vector database query to cause a second vector similarity search of the one or more documents based on the second embedded representation of the second query;

receive, from the vector database, a fifth ranking of the one or more documents in response to the second vector database query;

determine a sixth ranking of the one or more documents based on the fourth ranking and the fifth ranking;

select one or more second top documents from the sixth ranking;

determine a second knowledge graph based on the one or more second top documents;

output the second query, the one or more second top documents, the second knowledge graph, the one or more response hints, and the draft response to the first LLM; and receive, from the first LLM, a second response.

14. The non-transitory computer-readable storage medium of claim 13, wherein the one or more response hints represent long-term memory across a plurality of interactions, include the first query, the first response, the second query, and the second response.

15. The non-transitory computer-readable storage medium of claim 13, wherein:

the first query and the first response occur during a first user session of the client device; and the second query and the second response occur during a second user session of the client device.

16. A system comprising:

one or more non-transitory computer-readable media; and one or more processors communicatively coupled to the one or more non-transitory computer-readable media, the one or more processors configured to execute processor-executable instructions stored in the non-transitory computer-readable media to:

receive one or more documents;

add the one or more documents to a vector database;

add the one or more documents to a sparse database;

receive, from a client device, a first query include one or more first terms;

generate one or more first tokens based on the one or more first terms;

determine a first ranking of the one or more documents use a probabilistic ranking method based on the one or more first tokens;

generate a first embedded representation of the first query using the one or more first tokens;

output, to the vector database, a first vector database query to cause a vector similarity search of the one or more documents based on the first embedded representation of the first query;

receive, from the vector database, a second ranking of the one or more documents in response to the first vector database query;

determine a third ranking of the one or more documents based on the first ranking and the second ranking;

select one or more first top documents from the third ranking;

determine a first knowledge graph based on the one or more first top documents;

output the first query, the one or more first top documents, and at least a portion of the first knowledge graph to a first LLM;

receive, from the first LLM, a first response; and output the first response to the client device.

17. The system of claim 16, further comprising additional processor-executable instructions stored in the non-transitory computer-readable media to:

receive, from the client device, a second query include one or more second terms;

output, to a second LLM, the second query and information about the first query and the first response;

receive, from the second LLM, one or more response hints and a draft response associated with the second query;

generate one or more second tokens based on the one or more second terms;

determine a fourth ranking of the one or more documents using the probabilistic ranking method based on the one or more second tokens;

generate a second embedded representation of the second query using the one or more second tokens;

output, to the vector database, a second vector database query to cause a second vector similarity search of the one or more documents based on the second embedded representation of the second query;

receive, from the vector database, a fifth ranking of the one or more documents in response to the second vector database query;

determine a sixth ranking of the one or more documents based on the fourth ranking and the fifth ranking;

select one or more second top documents from the sixth ranking;

determine a second knowledge graph based on the one or more second top documents;

output the second query, the one or more second top documents, the second knowledge graph, the one or more response hints, and the draft response to the first LLM; and receive, from the first LLM, a second response.

18. The system of claim 17, wherein the one or more response hints represent long-term memory across a plurality of interactions, include the first query, the first response, the second query, and the second response.

19. The system of claim 17, wherein:

the first query and the first response occur during a first user session of the client device; and the second query and the second response occur during a second user session of the client device.

20. The system of claim 16, wherein the first query, the one or more first top documents, and the first knowledge graph include structured information and unstructured information.

* * * * *